US009855766B2

(12) United States Patent
Suzuki

(10) Patent No.: US 9,855,766 B2
(45) Date of Patent: Jan. 2, 2018

(54) ROD LENS ARRAY, LED PRINT HEAD, CONTACT IMAGE SENSOR HEAD, IMAGE FORMING APPARATUS, AND IMAGE READING APPARATUS

(71) Applicant: Oki Data Corporation, Minato-ku, Tokyo (JP)

(72) Inventor: Takahito Suzuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/861,417

(22) Filed: Sep. 22, 2015

(65) Prior Publication Data

US 2016/0152039 A1 Jun. 2, 2016

(30) Foreign Application Priority Data

Nov. 27, 2014 (JP) ................................. 2014-239923

(51) Int. Cl.
| | |
|---|---|
| B41J 2/45 | (2006.01) |
| G02B 7/02 | (2006.01) |
| G02B 3/06 | (2006.01) |
| G02B 3/00 | (2006.01) |
| G02B 13/24 | (2006.01) |

(52) U.S. Cl.
CPC ............. *B41J 2/451* (2013.01); *G02B 3/005* (2013.01); *G02B 3/0075* (2013.01); *G02B 3/06* (2013.01); *G02B 7/028* (2013.01); *G02B 13/24* (2013.01)

(58) Field of Classification Search
CPC .......... B41J 2/451; G02B 13/24; G02B 7/028; G02B 3/06; G02B 3/0075; G02B 3/005
See application file for complete search history.

(56) References Cited

U.S. PATENT DOCUMENTS

| | | | | | |
|---|---|---|---|---|---|
| 4,875,057 | A | * | 10/1989 | Hediger | .................... B41J 2/451 347/238 |
| 4,913,526 | A | * | 4/1990 | Hediger | .................... B41J 2/451 355/1 |
| 5,500,523 | A | * | 3/1996 | Hamanaka | ........... G02B 3/0006 250/216 |
| 6,563,647 | B2 | * | 5/2003 | Fukuzawa | ............ G02B 3/0056 359/619 |
| 6,724,537 | B2 | * | 4/2004 | Ogi | ........................ G02B 3/005 250/208.1 |
| 7,012,235 | B2 | * | 3/2006 | Matsumoto | .......... G02B 3/0037 250/208.1 |
| 7,417,659 | B2 | * | 8/2008 | Yamamura | ............... B41J 2/451 347/236 |
| 2003/0021034 | A1 | * | 1/2003 | Yoshikawa | .......... G02B 3/0031 359/619 |

(Continued)

FOREIGN PATENT DOCUMENTS

JP 2005181949 A 7/2005

*Primary Examiner* — Patrick King
(74) *Attorney, Agent, or Firm* — Panitch Schwarze Belisario & Nadel LLP

(57) ABSTRACT

Provided is a rod lens array that includes: a plurality of lenses; and a pair of side plate sections interposing side surfaces of the respective lenses in between to hold the lenses, and each including a first side plate provided adjacent to the lenses, and a second side plate provided on outer side of the first side plate, and having machinability lower than machinability of the first side plate, and a linear expansion coefficient smaller than linear expansion coefficient of the first side plate.

15 Claims, 22 Drawing Sheets

(56) References Cited

U.S. PATENT DOCUMENTS

| | | | |
|---|---|---|---|
| 2009/0078854 A1* | 3/2009 | Tsujino | B41J 2/45 250/208.1 |
| 2010/0067954 A1* | 3/2010 | Inoue | G03G 15/326 399/220 |
| 2013/0286146 A1* | 10/2013 | Kitamura | G02B 13/0095 347/224 |

* cited by examiner

ROD LENS ARRAY, LED PRINT HEAD, CONTACT IMAGE SENSOR HEAD, IMAGE FORMING APPARATUS, AND IMAGE READING APPARATUS

CROSS REFERENCE TO RELATED APPLICATIONS

This application claims the benefit of Japanese Priority Patent Application JP2014-239923 filed on Nov. 27, 2014, the entire contents of which are incorporated herein by reference.

BACKGROUND

The invention relates to a rod lens array, an LED print head that includes the rod lens array, an image forming apparatus that includes the LED print head, a contact image sensor head that includes the rod lens array, and an image reading apparatus that includes the contact image sensor head.

In general, a rod lens array may be used in applications such as, but not limited to, a light-emitting diode (LED) print head and a contact image sensor. The LED print head may be used for an exposure unit of an LED printer, whereas the contact image sensor may be used for a reading unit of an image scanner. The rod lens array has a plurality of gradient index lenses (referred to as "lenses" hereinafter) that are arrayed in line, and may have an example configuration in which the plurality of lenses are arrayed in parallel to each other between two substrates, or two side plates, that are fixed with use of an adhesive or any other suitable fixing method. The two substrates each may be a plate member made of a material such as, but not limited to, a phenol resin, an acrylonitrile butadiene styrene (ABS) resin, an epoxy resin, and an acrylic resin. For example, reference is made to Japanese Unexamined Patent Application Publication No. 2005-181949.

SUMMARY

Use of a plate member, such as any of those described above, for substrates of a rod lens array may cause a variation in dimension of the rod lens array resulting from a change in usage environment under which the rod lens array is used. The change in usage environment may include, without limitation, a change in humidity, a change in temperature, or a change in any other factor. The variation in dimension of the rod lens array may include, without limitation, thermal expansion, expansion attributed to moisture absorption, or any other factor that causes variation in dimension of the rod lens array. Hence, when the rod lens array that includes side plates structured by such plate members is used in an LED print head, a positional relationship between semiconductor devices, such as LEDs, provided in the LED print head and the rod lens array may be varied, making it difficult to maintain stable light illumination performance and thus leading to unstable image formation quality. When the rod lens array that includes the side plates structured by such plate members is used in a contact image sensor, a positional relationship between semiconductor devices, such as photodiodes, provided in the contact image sensor and the rod lens array may be varied, making it difficult to maintain stable light reception performance and thus leading to unstable image reading quality.

It is desirable to provide a rod lens array that is small in variation of dimension irrespective of a change in usage environment, an LED print head that includes the rod lens array, a contact image sensor head that includes the rod lens array, an image forming apparatus that includes the LED print head, and an image reading apparatus that includes the contact image sensor head.

A rod lens array according to an embodiment of the invention includes: a plurality of lenses; and a pair of side plate sections (which may alternatively be referenced as "plate sections") interposing side surfaces of the respective lenses in between to hold the lenses, and each including a first side plate (a "side plate" may alternatively be referenced as simply a "plate") provided adjacent to the lenses, and a second side plate provided on outer side of the first side plate, and having machinability lower than machinability of the first side plate, and a linear expansion coefficient smaller than linear expansion coefficient of the first side plate.

The rod lens array according to the above-described embodiment of the invention makes it possible to make a variation in dimension small irrespective of a change in usage environment.

An LED print head according to an embodiment of the invention includes the rod lens array according to the above-described embodiment. Hence, it is possible to achieve stable light illumination performance irrespective of a change in usage environment.

A contact image sensor head according to an embodiment of the invention includes the rod lens array according to the above-described embodiment. Hence, it is possible to achieve stable light reception performance irrespective of a change in usage environment.

An image forming apparatus according to an embodiment of the invention includes the rod lens array according to the above-described embodiment. Hence, it is possible to maintain stable printing quality irrespective of a change in usage environment.

An image reading apparatus according to an embodiment of the invention includes the rod lens array according to the above-described embodiment. Hence, it is possible to maintain stable image reading quality irrespective of a change in usage environment.

It is to be understood that both the foregoing general description and the following detailed description are exemplary, and are intended to provide further explanation of the invention as claimed. Also, effects of the invention are not limited to those described above. Effects achieved by the invention may be those that are different from the above-described effects, or may include other effects in addition to those described above.

DETAILED DESCRIPTION

In the following, some example embodiments of the invention are described in detail with reference to the accompanying drawings. Note that the following description is directed to illustrative examples of the invention and not to be construed as limiting to the invention. Also, factors including, without limitation, arrangement, dimensions, and a dimensional ratio of elements illustrated in each drawing are illustrative only and not to be construed as limiting to the invention.

[First Example Embodiment]
[Configuration of Rod Lens Array 101]

Figure 1:
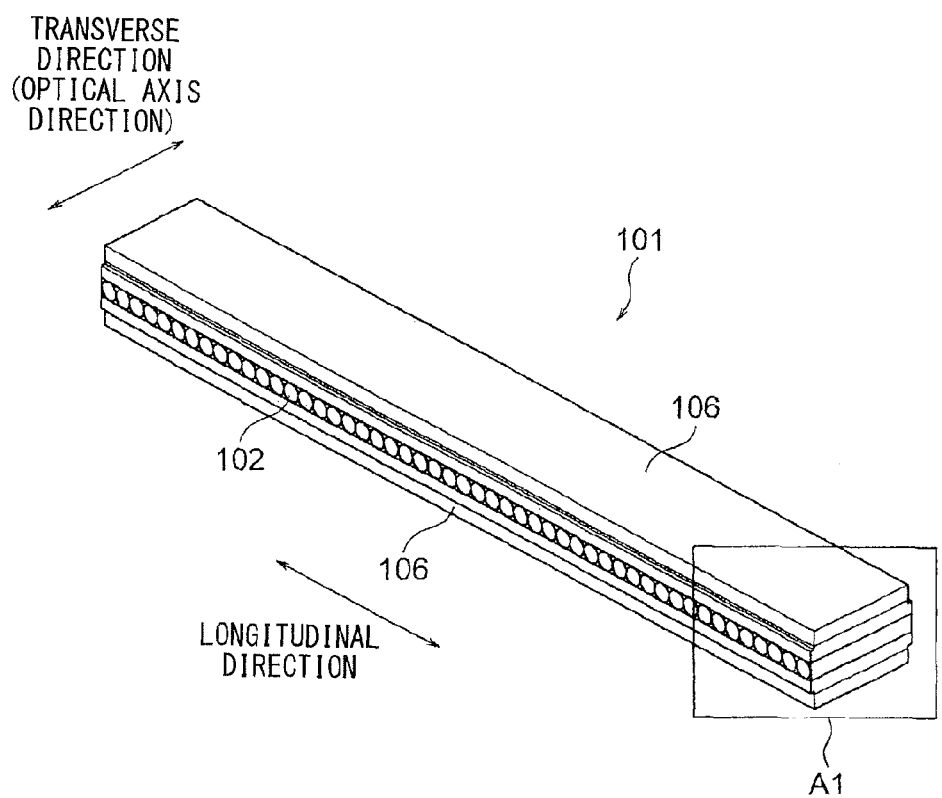
FIG. 1 is a perspective view of a rod lens array according to a first example embodiment of the invention.

FIG. 1 is a perspective view of a rod lens array 101 according to a first example embodiment of the invention. The rod lens array 101 includes a plurality of lenses 102, and hybrid side plates 106 as a pair of side plate sections that interpose side surfaces of the respective lenses 102 in between to hold the lenses 102. The lenses 102 each may be a lens or a "rod lens" having a refractive index distribution and made of a plastic material such as, but not limited to, an acrylic resin. The lenses 102 may be provided in array in a direction orthogonal to an optical axis direction of the lenses 102 (i.e., arrayed in a longitudinal direction), and are interposed between the pair of hybrid side plates 106 to be held by the hybrid side plates 106. Non-limiting examples of the acrylic resin as one example of the material of the lenses 102 may include a polymethyl methacrylate (PMMA) resin and a methacrylate (MMA) resin. Note that the rod lens array 101 is not limited to the configuration in which the lenses 102 are arrayed in a single line. The lenses 102 may be arrayed in two or more lines in a direction orthogonal to both a transverse direction and the longitudinal direction.

Figure 2:
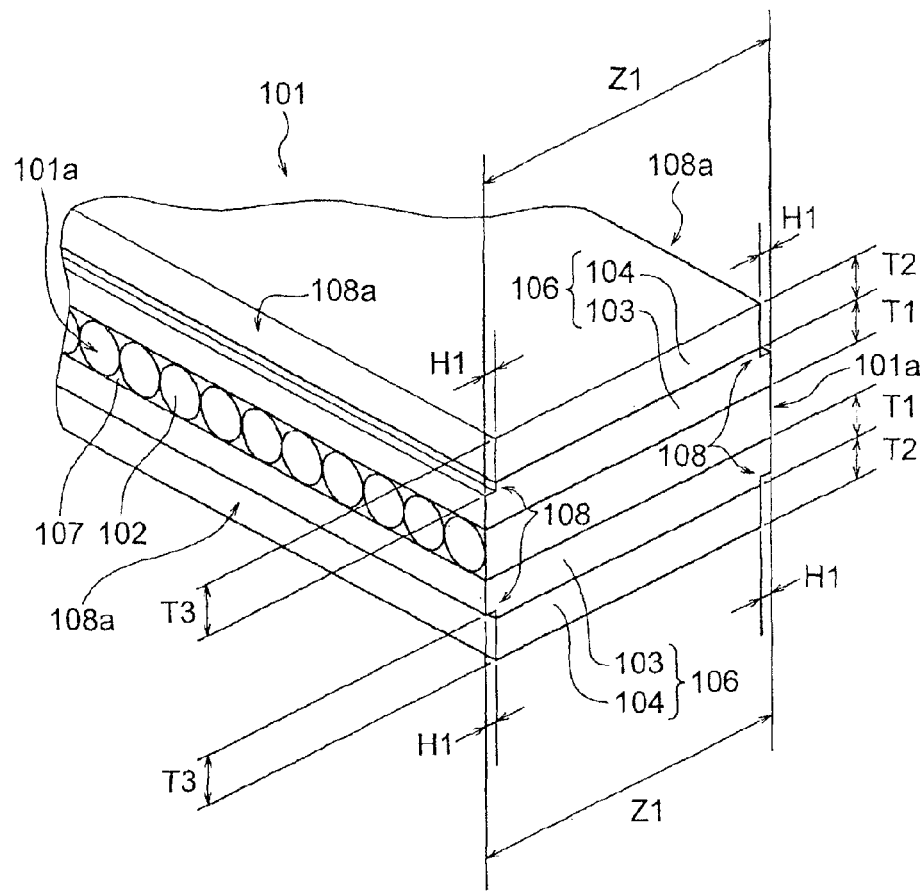
FIG. 2 is an enlarged perspective view of a part of the rod lens array illustrated in FIG. 1.

FIG. 2 is an enlarged perspective view of a region A1 of the rod lens array 101 illustrated in FIG. 1. The hybrid side plates 106 each include a first side plate 103 and a second side plate 104. The first side plate 103 and the second side plate 104 may be so press bonded with use of an adhesive as to be overlaid with each other.

The first side plate 103 may be made of a material having high machinability, i.e., a material having good workability or a material in which machining is easily performable. The first side plate 103 may preferably have Vickers hardness upon completion of the rod lens array 101 of 100 HV or less, for example. Hence, the first side plate 103 may preferably include one of a phenol resin, an epoxy resin, an acrylonitrile butadiene styrene (ABS) resin, and the acrylic resin as a constituent material. Also, the first side plate 103 may preferably have a linear expansion coefficient upon completion of the rod lens array 101 in a range from 4 ppm/° C. to 30 ppm/° C.

The second side plate 104 may be made of a material having a small linear expansion coefficient. The second side plate 104 may preferably have the linear expansion coefficient upon completion of the rod lens array 101 in a range from 4 ppm/° C. to 15 ppm/° C. Also, the second side plate 104 may have water absorption upon completion of the rod lens array 101 of 0.1% or less. Hence, the second side plate 104 may preferably include one of a glass epoxy resin, the ABS resin mixed with a glass filler, glass, and a ceramic as a constituent material.

The first side plate 103 has the machinability higher than the machinability of the second side plate 104, i.e., is easy to be machined as compared with the second side plate 104. In other words, the second side plate 104 has the machinability lower than the machinability of the first side plate 103, i.e., is difficult to be machined as compared with the first side plate 103. The second side plate 104 may have hardness (such as, but not limited to, Vickers hardness) upon completion of the rod lens array 101 higher than hardness of the first side plate 103, i.e., the second side plate 104 may be harder than the first side plate 103 upon completion of the rod lens array 101. Using the first side plate 103 and the second side plate 104 that satisfy such a relationship makes it possible to suppress any deformation (such as, but not limited to, expansion and contraction) that may occur in the longitudinal direction of the first side plate 103 as a result of a change in usage environment such as, but not limited to, a change in humidity, a change in temperature, or a change in any other factor. In other words, this makes it possible to reduce stress, occurring at the first side plate 103 as a result of the change in the usage environment, by means of the second side plate 104 fixed in an overlaid fashion to the first side plate 103, and thereby to suppress any deformation of the first side plate 103.

Also, the second side plate 104 has the linear expansion coefficient upon completion of the rod lens array 101 smaller than the linear expansion coefficient of the first side plate 103. Making the linear expansion coefficient of the second side plate 104 smaller than the linear expansion coefficient of the first side plate 103 makes it possible to suppress any deformation (such as, but not limited to, expansion and contraction) that may occur in the longitudinal direction of the first side plate 103 as a result of the change in the usage environment such as, but not limited to, a change in humidity, a change in temperature, or a change in any other factor. In other words, making the linear expansion coefficient of the second side plate 104 smaller than the linear expansion coefficient of the first side plate 103 makes it possible to reduce the stress, occurring at the first side plate 103 as a result of the change in the usage environment including the changes in humidity and temperature, by means of the second side plate 104 fixed in an overlaid fashion to the first side plate 103, and thereby to suppress any deformation of the first side plate 103.

Hence, for the first side plate 103 and the second side plate 104 that structure each of the hybrid side plates 106, causing the machinability of the second side plate 104 to be lower than the machinability of the first side plate 103 and causing the linear expansion coefficient of the second side plate 104 to be smaller than the linear expansion coefficient of the first side plate 103 make it possible to make variation in dimension of the rod lens array 101 small irrespective of the change in the usage environment such as, but not limited to, a change in humidity, a change in temperature, or a change in any other factor.

An adhesive that bonds the first side plate 103 and the second side plate 104 together may be an epoxy-based adhesive, and may be in the form of a liquid or a sheet. It is preferable that, in order to prevent a reduction in machinability of the first side plate 103, the adhesive be free from a component that may likely to reduce the machinability. Such a component may be, for example but not limited to, filler. Press bonding of the first side plate 103 and the second side plate 104 that structure each of the hybrid side plates 106 by means of the adhesive or any other suitable fixing method makes it difficult to cause detachment of the first side plate 103 and the second side plate 104 even upon occurrence of stress between the first side plate 103 and the second side plate 104 as a result of the change in the usage environment including the changes in humidity and temperature.

The lenses 102 may be provided in array, and both sides of each of the lenses 102 are sandwiched by the pair of hybrid side plates 106. Gaps formed by the lenses 102 and one of the hybrid side plates 106 and between the lenses 102 and the other of the hybrid side plates 106 each may be filled with an adhesive 107, thereby bonding the lenses 102 and the hybrid side plates 106 together. The first side plates 103 of the pair of hybrid side plates 106 may be so disposed as to face the lenses 102. In other words, a surface of each of the first side plates 103 may serve as a bonding surface that comes into bonding contact with the lenses 102. The pair of hybrid side plates 106 may preferably have the same thickness as each other.

Referring to FIG. 2, the first side plate 103 and the second side plate 104 may respectively have a thickness T1 and a thickness T2 each of which may be any thickness in a range from 0.5 mm to 2.0 mm without limitation. The thickness T1 of the first side plate 103 may preferably be smaller than the thickness T2 of the second side plate 104. In other words, making the thickness T1 smaller than the thickness T2 (T1<T2) allows an influence of stress, occurring at the first side plate 103 as a result of the change in the usage environment including the changes in humidity and temperature, to be small and thereby allows for a reduction in deformation of the first side plate 103. More specifically, satisfying the relationship of T1<T2 makes it possible to reduce an influence of linear expansion of the first side plate 103 (such as, but not limited to, warpage that occurs in the longitudinal direction of the first side plate 103) by means of the second side plate 104 fixed in an overlaid fashion to the first side plate 103, and thereby to suppress any deformation of the first side plate 103.

Further, the first side plate 103 and the second side plate 104 may be so disposed in the rod lens array 101 as to be line symmetric with respect to the arrayed lenses 102 as an axis of symmetry. This causes the pair of hybrid side plates 106, disposed with the lenses 102 provided in between, to offset each other stresses that occur at the respective hybrid side plates 106 as a result of the change in the usage environment including the changes in humidity and temperature, and thereby makes it possible to cancel out the stress by means of the rod lens array 101 as a whole. Hence, it is possible to suppress any deformation (such as, but not limited to, warpage) that occurs in the longitudinal direction of the rod lens array 101.

Note that the relationship between the thickness T1 and the thickness T2 is not limited by the structure that satisfies the relationship of T1<T2. The relationship between the thickness T1 and the thickness T2 may be defined as T1≥T2. Even upon occurrence of the stresses at the respective hybrid side plates 106 as a result of the change in the usage environment including the changes in humidity and temperature in the example where the relationship of T1≥T2 is satisfied, so disposing the first side plate 103 and the second side plate 104 in the rod lens array 101 as to be line symmetric with respect to the arrayed lenses 102 as an axis of symmetry makes it possible to cause the pair of hybrid side plates 106, disposed with the lenses 102 provided in between, to offset each other the stresses that occur at the respective hybrid side plates 106. Thereby, this makes it possible to cancel out the stress by means of the rod lens array 101 as a whole, making it possible to suppress any deformation (such as, but not limited to, the warpage) that occurs in the longitudinal direction of the rod lens array 101.

As illustrated in FIG. 2, both ends of each of the first side plates 103, in the optical axis direction of each of the lenses 102 (i.e., the transverse direction of the first side plates 103), each may be provided with a step 108 that serves as a step section. Providing the step 108 results in formation of a second principal surface 108a in the longitudinal direction of the rod lens array 101. The second principal surface 108a may be defined by a part of a tip of each of the first side plates 103 in the transverse direction and a surface located at a tip of each of the second side plates 104 in the transverse direction. The second principal surface 108a may have a width of T3.

Surfaces located at both ends of the lenses 102 in the optical axis direction of each of the lenses 102 may be protruded more outward in the optical axis direction than both ends of each of the second side plates 104 in the optical axis direction (i.e., the transverse direction of the second side plates 104). In other words, a first principal surface 101a protrudes at the most at each of both ends in the transverse direction of the rod lens array 101. The first principal surfaces 101a each may be formed by: the surface located at each of the both ends of the lenses 102 in the optical axis direction of each of the lenses 102; a part of each of both ends in the transverse direction of each of the first side plates 103; and the adhesive 107 that fills a region between the lenses 102 and the corresponding first side plate 103. A distance between the first principal surface 101a and the second principal surface 108a may be defined as H1. Causing the both ends of the lenses 102 in the optical axis direction of each of the lenses 102 to protruded outward in the transverse direction at the both ends in the transverse direction of the rod lens array 101 allows for easier cleaning of surfaces at the both ends of the lenses 102, making it possible to maintain optical performance of the rod lens array 101.

The rod lens array 101 may have a length in the optical axis direction (a direction in which light is transmitted) of Z1. In other words, a length extending from the first principal surface 101a located at one end in the optical axis direction of the rod lens array 101 to the first principal surface 101a located at the other end in the optical axis direction of the rod lens array 101 may be defined as Z1. The length Z1, or a finished width, in the optical axis direction (the light transmission direction) of the rod lens array 101 may have a span of adjustable range to some extent in order to provide any conjugation length.

The rod lens array 101 according to the foregoing first example embodiment makes it possible make the variation in dimension small irrespective of the change in the usage environment such as, but not limited to, the change in humidity, the change in temperature, or the change in any other factor.

[Method of Manufacturing Rod Lens Array 101]

In general, lenses structuring a rod lens array may be lenses made of a glass material or lenses made of a plastic material. In view of an occurrence of a variation in position or shape of tips in the optical axis direction of the respective lenses arrayed in line which may occur in a manufacturing process of the rod lens array that uses the lenses made of such a material, it is desirable that cross-sections of respective lens portions in the optical axis direction of the rod lens array eventually be made evenly uniform. Hence, the rod lens array that uses the lenses made of the glass material may be subjected to finishing of the cross-sections of the lenses by means of polishing performed on tips of the respective lens portions, for example. Also, the rod lens array that uses the lenses made of the plastic material may be subjected to finishing of the cross-sections of the lenses by means of cutting performed on the tips of the respective lenses using a linear cutting apparatus provided with a cutting blade.

A method of finishing the cross-sections of the lenses by means of the cutting performed on the tips of the respective lenses made of the plastic material using the linear cutting apparatus allows for simplification of a manufacturing process as compared with a method of finishing the cross-sections of the lenses by means of the polishing performed on the tips of the respective lens portions made of the glass material. Hence, manufacturing the rod lens array using the lenses made of the plastic material makes it possible to increase production efficiency of the rod lens array. However, it is, in fact, difficult to cut only the lens portions of the rod lens array upon cutting of the tips of the respective lenses of the rod lens array using the linear cutting apparatus, and it normally results in cutting of side plates or other members disposed around the lens portions as well. For this reason, it is preferable that the side plates, or other members, disposed round the lenses be made of a material less likely to damage the cutting blade of the linear cutting apparatus.

In addition, the side plates, or other members, disposed around the lenses each may often be made of, for example but not limited to, a phenol resin, an ABS resin, an epoxy resin, or an acrylic resin. Using such a material for the side plates, or other members, may lead to a variation in dimension of the rod lens array resulting from the change in the usage environment including the changes in humidity and temperature.

To address this, in the first side plate 103 and the second side plate 104 that structure each of the hybrid side plates 106, the first side plate 103 is made of a material having higher machinability than the machinability of the second side plate 104 whereas the second side plate 104 is made of a material having lower machinability than the machinability of the first side plate 103 and having smaller linear expansion coefficient than the linear expansion coefficient of the first side plate 103, as described in "Configuration of Rod Lens Array 101". Using such materials for the first side plate 103 and the second side plate 104 achieves the reduced variation in dimension of the rod lens array 101 irrespective of the change in the usage environment including the changes in humidity and temperature.

Upon manufacturing such a rod lens array 101, it is preferable that damaging of the cutting blade attributed to contact of the cutting blade with the material having low machinability (such as the second side plates 104 containing the glass material) be avoided in the finishing process performed on the cross-sections of the lenses using the linear cutting apparatus. In the following, a description is given of a method of manufacturing the rod lens array 101 that uses the hybrid side plates 106 having components that are low in machinability (such as, but not limited to, the second side plates 104).

Figure 3A:
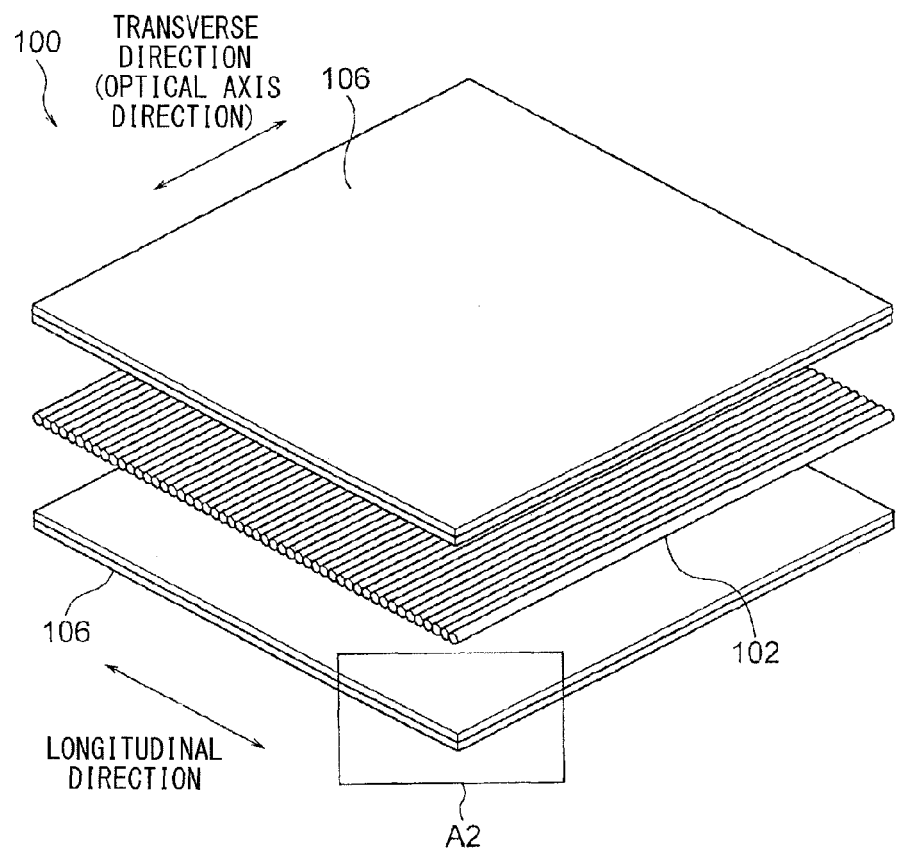
FIG. 3A is a perspective view of a structure in assembly of a rod lens array sheet in a first process step of a method of manufacturing the rod lens array according to the first example embodiment.
Figure 3B:
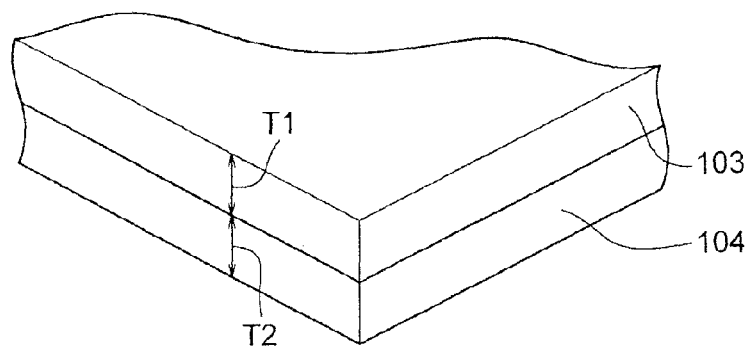
FIG. 3B is an enlarged perspective view of a part of a hybrid side plate in the rod lens array sheet illustrated in FIG. 3A.
Figure 4:
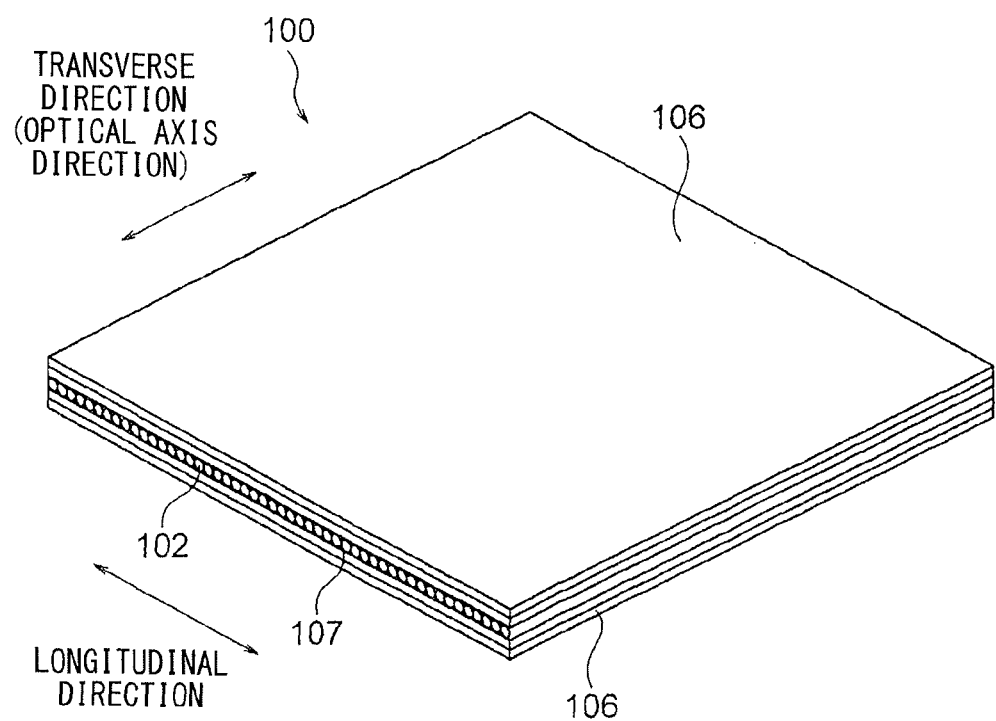
FIG. 4 is a schematic perspective view of the rod lens array sheet assembled in the first process step in the method of manufacturing the rod lens array according to the first example embodiment.

FIG. 3A is a perspective view of a structure in assembly of a rod lens array sheet 100 in a first process step of a method of manufacturing the rod lens array 101 according to the first example embodiment. FIG. 3B is an enlarged perspective view of a region A2 of one of the hybrid side plates 106 in the rod lens array sheet 100 illustrated in FIG. 3A. FIG. 4 is a schematic perspective view of the rod lens array sheet 100 assembled in the first process step in the method of manufacturing the rod lens array 101 according to the first example embodiment.

Referring to FIG. 3A, the first side plate 103 and the second side plate 104 may be subjected to the press bonding by means of the adhesive or any other suitable fixing method to fabricate two hybrid side plates 106 in advance. The first process step of the method of manufacturing the rod lens array 101 may include aligning the lenses 102 and bonding the lenses 102 and the hybrid side plates 106 together.

In the aligning of the lenses 102, the lenses 102 may be so disposed on one of the two hybrid side plates 106 that the first side plates 103 of the respective hybrid side plates 106 face the lenses 102. Here, the lenses 102 may be so aligned that optical axes (central axes) of the respective lenses 102 are substantially parallel to each other. The thus-aligned lenses 102 may be referred to as a "lens array". A surface of one of the first side plates 103 in the respective hybrid side plates 106 may be coated with the adhesive 107 in advance, and the lenses 102, or the lens array, may be temporarily fixed in array to one of the hybrid side plates 106.

Then, in the boding of the lenses 102 and the hybrid side plates 106, a side surface of the plurality of temporarily-fixed lenses 102 is coated with the adhesive 107 to form a layer of the adhesive 107. In this state, the other hybrid side plate 106 may be so disposed above the temporarily-fixed lenses 102 that the first side plate 103 of the other hybrid side plate 106 faces the lenses 102. Further, while the other hybrid side plate 106 is disposed above the temporarily-fixed lenses 102 in this manner, performing pressing of the hybrid side plates 106 causes the adhesive 107 to be filled between the lenses 102 and the corresponding hybrid side plate 106, thereby bonding the lenses 102 and the hybrid side plates 106 together.

In the first process step, the lenses 102 are sandwiched by the two hybrid side plates 106 to fabricate the rod lens array sheet 100 in this manner. Note that, although a description is given here of an example where a single layer structure is employed for a layer of the lenses 102 in the first process step, a multilayer structure in which two or more layers of the lenses 102 are formed may be employed. Also, in the bonding of the lenses 102 and the hybrid side plates 106, a jig may be used to fix the two hybrid side plates 106 together while the hybrid side plates 106 are pressed together with the lenses 102 interposed between the two hybrid side plates 106. Further, end surfaces on one side in the optical axis direction of the respective lenses 102 as well as end surfaces on one side in the optical axis direction of the respective hybrid side plates 106 may be immersed in the liquid adhesive and the adhesive may be sucked from end surfaces on the other side to cause the gaps formed between the lenses 102 and one of the hybrid side plates 106 and between the lenses 102 and the other of the hybrid side plates 106 to be filled with the adhesive.

Figure 5A:
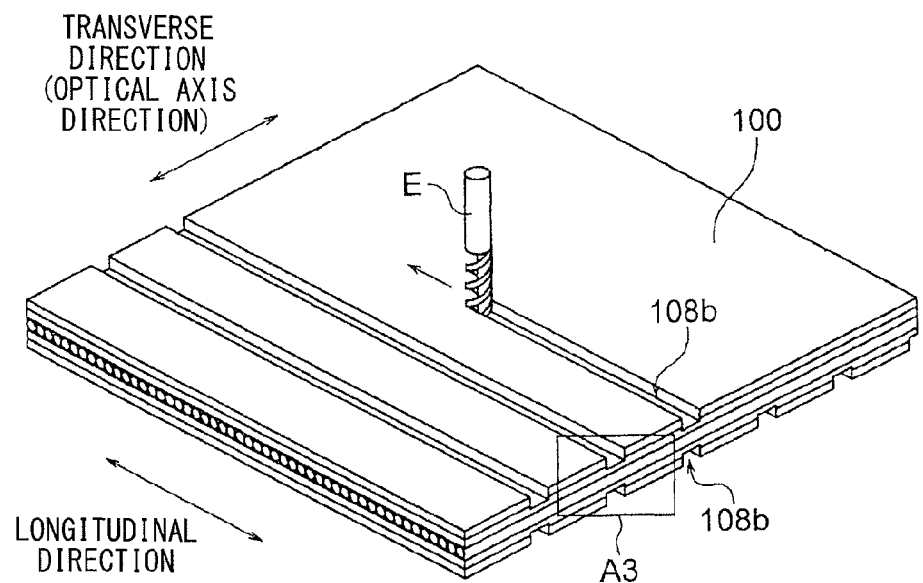
FIG. 5A is a perspective view of the rod lens array sheet upon groove processing in a second process step of the method of manufacturing the rod lens array according to the first example embodiment.
Figure 5B:
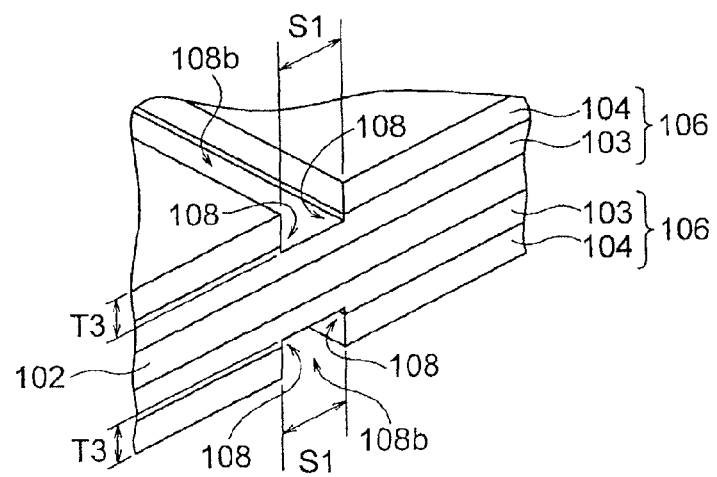
FIG. 5B is an enlarged perspective view of a part of the rod lens array sheet following the groove processing illustrated in FIG. 5A.

FIG. 5A is a perspective view of the rod lens array sheet 100 upon groove processing in a second process step of the method of manufacturing the rod lens array 101 according to the first example embodiment. FIG. 5B is an enlarged perspective view of a region A3 of the rod lens array sheet 100 following the groove processing illustrated in FIG. 5A.

The second process step of the method of manufacturing the rod lens array 101 may include processing grooves 108*b* for cutoff of the rod lens array sheet 100.

In the processing of the grooves 108*b* for the cutoff of the rod lens array sheet 100, the grooves 108*b* for cutting out the rod lens array 101 from the rod lens array sheet 100 may be formed on the front and the back of the rod lens array sheet 100. For example, an end mill E may be used to form the grooves 108*b* in the longitudinal direction of the rod lens array sheet 100. The grooves 108*b* may be formed at predetermined intervals in consideration of a length in the transverse direction of the rod lens array 101 upon completion of the rod lens array 101, in an example where the plurality of rod lens arrays 101 are to be cut out from the single rod lens array sheet 100, as illustrated in FIG. 5A.

Also, forming the grooves 108*b* for the cutoff of the rod lens array sheet 100 results in formation of the steps 108 as well. Hence, it is preferable that the grooves 108*b* be formed in consideration of shapes of the respective steps 108. In an example illustrated in FIG. 5B, each of the grooves 108*b* may be so formed that the grooves 108*b* each have a width of S1 in the transverse direction and a depth of T3. It is also preferable that the grooves 108*b* be so formed that a cutoff position (a cutoff center line) upon cutoff of the rod lens array sheet 100 in a subsequent process step (e.g., a third process step) comes into coincidence with a center line of the width S1.

Further, in a process step subsequent thereto (e.g., a fourth process step), a cutoff surface of the rod lens array sheet 100 may be cut by a predetermined amount to perform mirror finishing. Hence, the width S1 in the transverse direction of each of the grooves 108*b* may be determined in consideration of the cut amount upon the mirror finishing, such that the steps 108 are still formed (i.e., to prevent the steps 108 from being eliminated by the mirror finishing) after the mirror finishing has been performed, i.e., upon the completion of the rod lens array 101. In other words, the width S1 may be so determined that a cut width to be subjected to the cutting upon the mirror finishing is ensured in a process step subsequent thereto (e.g., the fourth process step).

Upon forming the grooves 108*b*, the grooves 108*b* may preferably be so formed that the depth of each of the grooves 108*b* reaches at least the corresponding first side plate 103 yet does not reach the lenses 102 (i.e., so formed as to provide the depth that does not damage the lenses 102). In other words, it is preferable that, in each of the grooves 108*b*, at least a region corresponding to the second side plate 104 be cut completely and a part of the first side plate 103 be cut to form the groove 108*b*. More specifically, the grooves 108*b* may preferably be so formed as to satisfy the expression "T2<T3<T1+T2" where the depth of any of the grooves 108*b* is T3. Note that the grooves 108*b* may be so processed that, in each of the grooves 108*b*, at least the region corresponding to the second side plate 104 is cut completely but a region corresponding to the first side plate 103 is prevented from being cut.

Figure 6A:
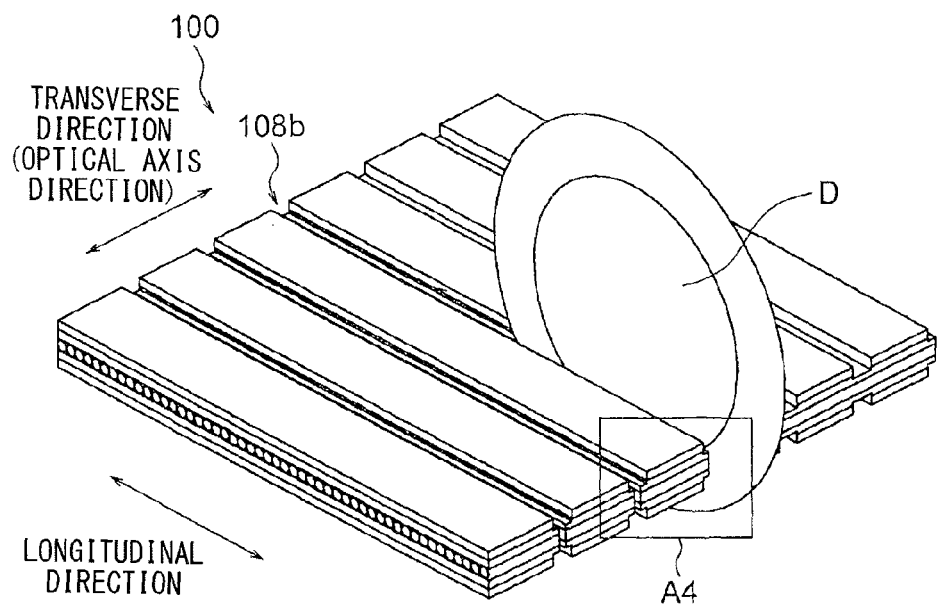
FIG. 6A is a perspective view of the rod lens array sheet upon a cutoff process in a third process step of the method of manufacturing the rod lens array according to the first example embodiment.
Figure 6B:
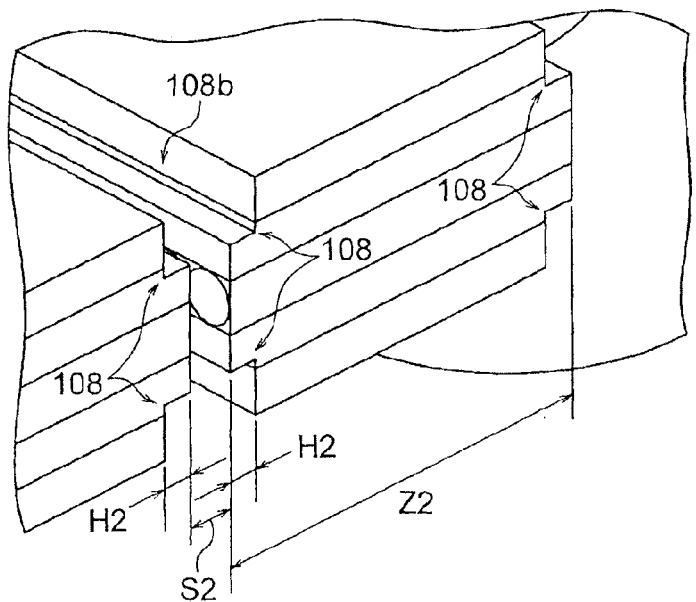
FIG. 6B is an enlarged perspective view of a part of the rod lens array sheet following the cutoff process illustrated in FIG. 6A.

FIG. 6A is a perspective view of the rod lens array sheet 100 upon the cutoff process in the third process step of the method of manufacturing the rod lens array 101 according to the first example embodiment. FIG. 6B is an enlarged perspective view of a region A4 of the rod lens array sheet 100 following the cutoff process illustrated in FIG. 6A.

The third process step of the method of manufacturing the rod lens array 101 may include cutting off the rod lens array sheet 100.

In the cutting off of the rod lens array sheet 100, the rod lens array sheet 100 may be cut off along the grooves 108*b*. For example, a dicing saw D may be used to cut off the rod lens array sheet 100 along the grooves 108*b*. In a process step subsequent thereto (e.g., the fourth process step), the cutoff surface of the rod lens array sheet 100 may be cut by a predetermined amount to perform the mirror finishing. Hence, the rod lens array sheet 100 may preferably be so cut off that the rod lens array 101 cut out from the rod lens array sheet 100 is longer than the length Z1 (denoted in FIG. 2) in the optical axis direction of the rod lens array 101 following the mirror finishing (i.e., longer than the length Z1 upon the completion of the rod lens array 101). In other words, the rod lens arrays sheet 100 may be so cut off as to satisfy the expression "Z1<Z2". In an example where the dicing saw D is used, the cutoff width of the rod lens array sheet 100 may be defined as S2, and the inside of each of the grooves 108*b* may be cut off to satisfy the expression "S1>S2".

The cutting off of the rod lens array sheet 100 results in formation of the cross-sections of the respective lenses 102 at positions each corresponding to a height H2 of the step 108 formed by the processing of the grooves 108*b* in the second process step.

Figure 7A:
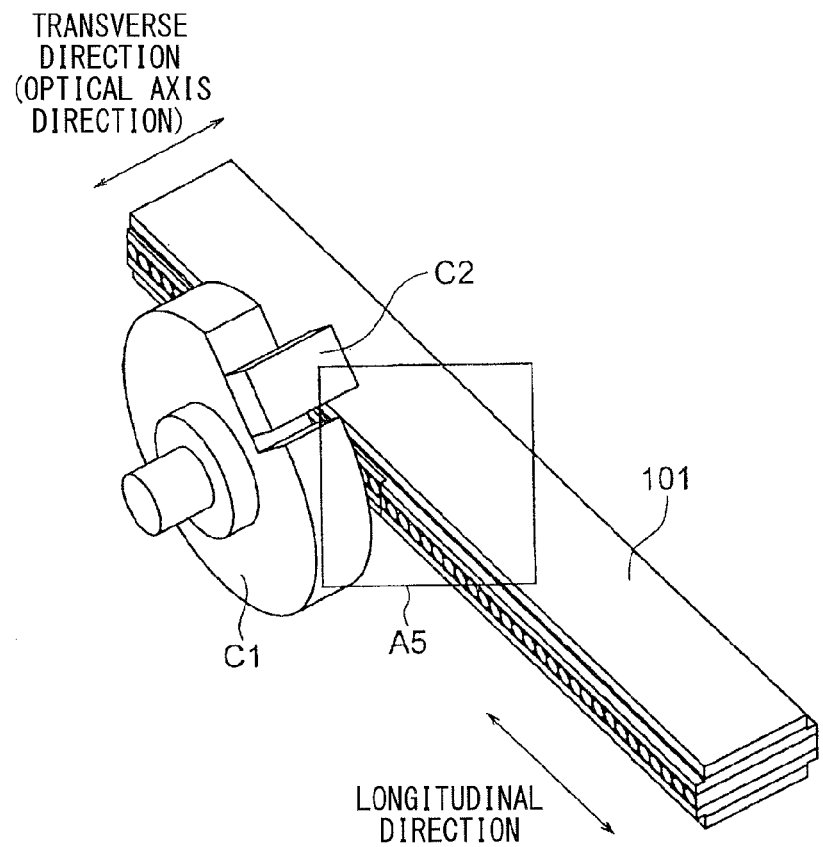
FIG. 7A is a perspective view of the rod lens array upon mirror finishing of a cross-section of each lens in a fourth process step of the method of manufacturing the rod lens array according to the first example embodiment.
Figure 7B:
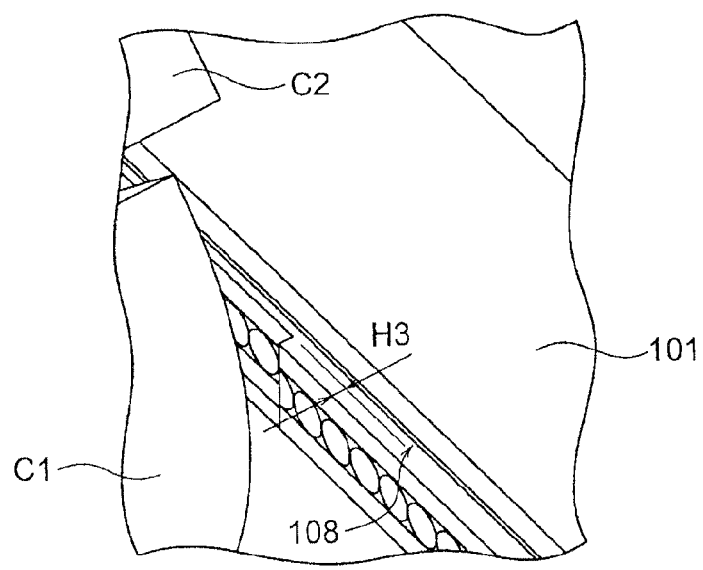
FIG. 7B is an enlarged perspective view of a part of the rod lens array upon the mirror finishing illustrated in FIG. 7A.

FIG. 7A is a perspective view of the rod lens array 101 upon the mirror finishing of the cross-section of each of the lenses 102 in the fourth process step of the method of manufacturing the rod lens array 101 according to the first example embodiment. FIG. 7B is an enlarged perspective view of a region A5 of the rod lens array 101 upon the mirror finishing illustrated in FIG. 7A.

The fourth process step of the method of manufacturing the rod lens array 101 may include the mirror finishing the cross-sections of the respective lenses 102 in the rod lens array 101.

In the mirror finishing of the cross-sections of the respective lenses 102 in the rod lens array 101, both the cross-sections of each of the lenses 102 formed after the cutoff process of the rod lens array sheet 100 may be mirror finished. For example, a cutting blade C2 fixed to a tip of a cutter wheel C1 may be used to cut the lenses 102 along the longitudinal direction of the rod lens array 101 by a width H3 in the optical axis direction of the lenses 102 to perform the mirror finishing of the cross-sections of the respective lenses 102. The foregoing process steps may complete the rod lens array 101.

Figure 8A:
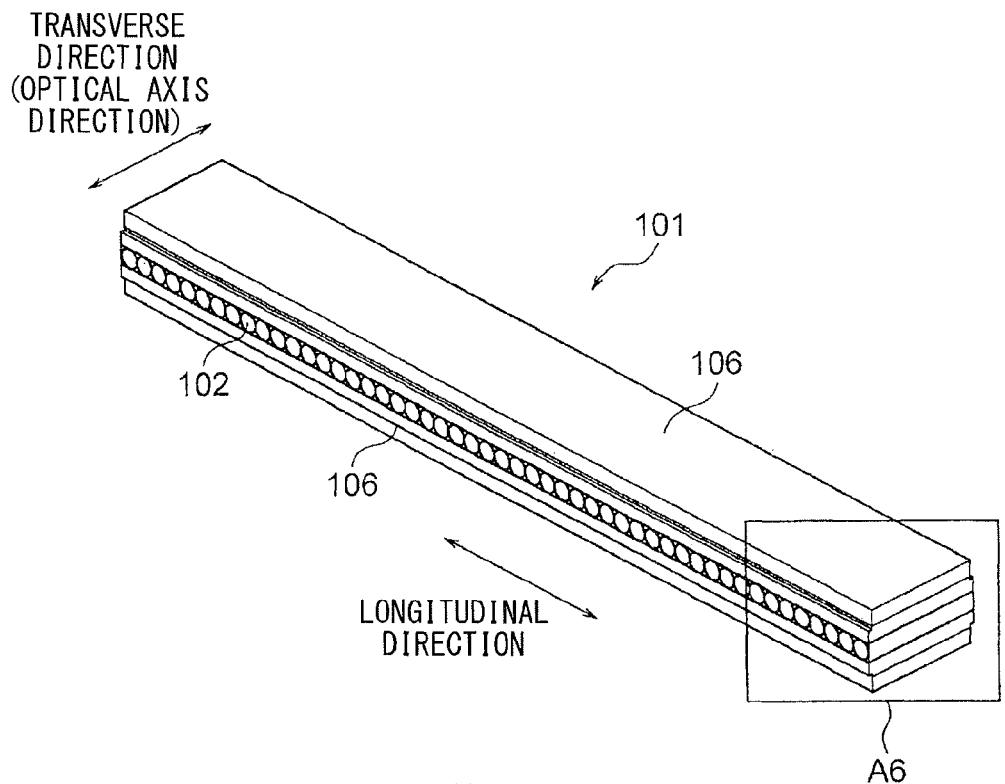
FIG. 8A is a perspective view of the rod lens array upon completion of the rod lens array according to the first example embodiment.
Figure 8B:
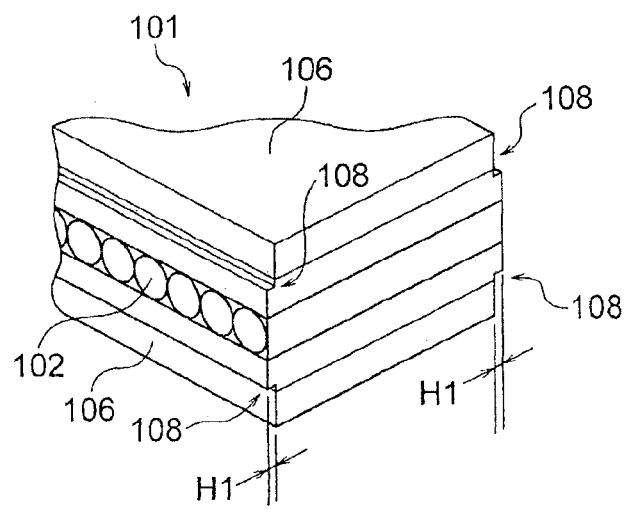
FIG. 8B is an enlarged perspective view of a part of the rod lens array illustrated in FIG. 8A.

FIG. 8A is a perspective view of the rod lens array 101 upon completion of the rod lens array 101 according to the first example embodiment. FIG. 8B is an enlarged perspective view of a region A6 of the rod lens array 101 illustrated in FIG. 8A.

The cutting of the cross-sections of the respective lenses 102 in the mirror finishing of the cross-sections of the respective lenses 102 in the rod lens array 101 provides the height H1 for each of the steps 108 formed from the second process step to the third process step. In other words, the cross-sections of the respective lenses 102 are formed at the positions each corresponding to the height H1 of the step 108.

In the method of manufacturing the rod lens array 101 according to the first example embodiment, the hybrid side plates 106 each including the first side plate 103 and the second side plate 104 and thus each serve as a hybrid member are used to manufacture the rod lens array 101, in which the first side plate 103 and the second side plate 104 may be press bonded in advance by means of the adhesive or any other suitable fixing method. Hence, it is possible to manufacture the rod lens array 101 that is small in variation of dimension irrespective of the change in the usage environment including the changes in humidity and temperature, and high in resistance to the stress occurring at the hybrid side plates 106.

Also, the width S1, the cutoff width S2, and the cut amount H3 may be so determined as to satisfy the expression "S1>2×H3+S2" in the process steps from the second process step to the third process step in the method of manufacturing the rod lens array 101 according to the first example embodiment. Hence, even when the material low in machinability is used for the second side plates 104, it is possible to prevent interference between the cutting blade C2 and the second side plates 104 (such as, but not limited to, a contact of the cutting blade C2 with the second side plates 104) upon performing the mirror finishing of the lenses 102 in the fourth process step. Hence, performing the groove processing in the second process step in consideration of the cut width S2 of the rod lens array sheet 100 in the third process step and the cut amount H3 upon the mirror finishing of the lenses 102 in the fourth process step makes it possible to perform the mirror finishing of the lenses 102 while significantly reducing damage on the cutting blade C2 upon performing the mirror finishing of the lenses 102 using the linear cutting apparatus to thereby manufacture the rod lens array 101.

[Second Example Embodiment]
[Configuration of Rod Lens Array 201]

Figure 9:
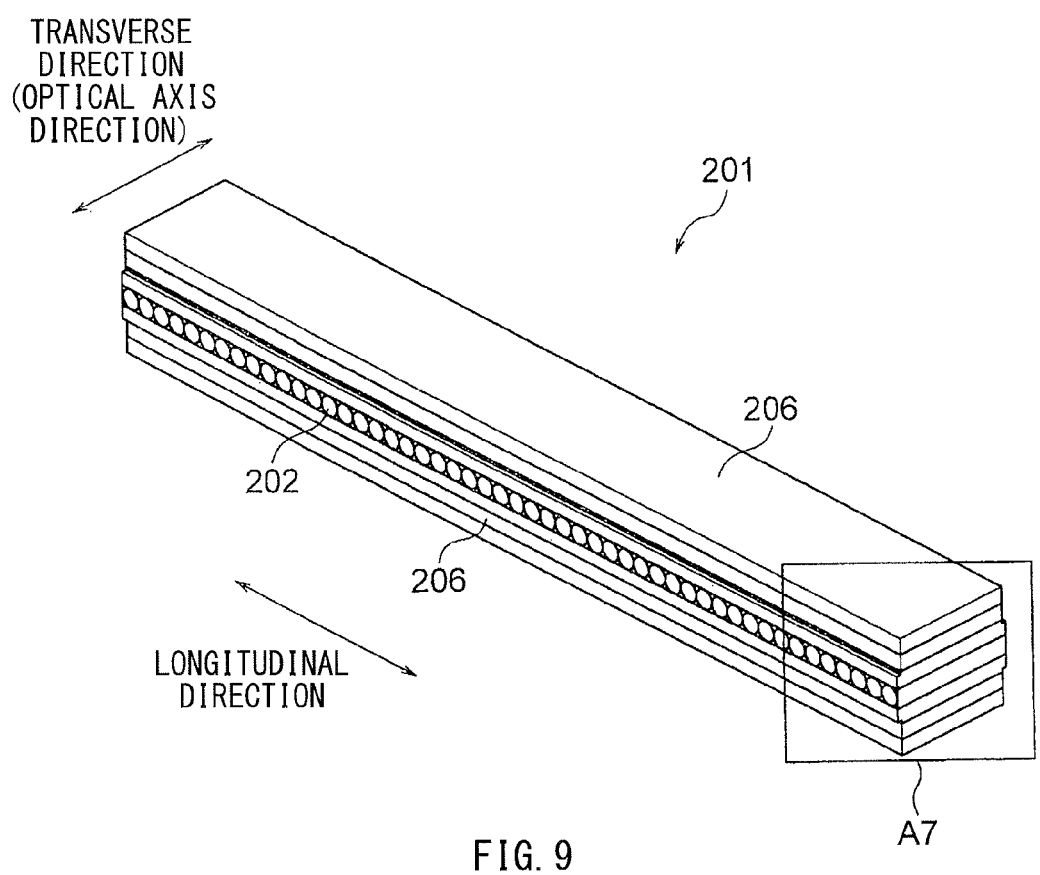
FIG. 9 is a perspective view of a rod lens array according to a second example embodiment of the invention.
Figure 10:
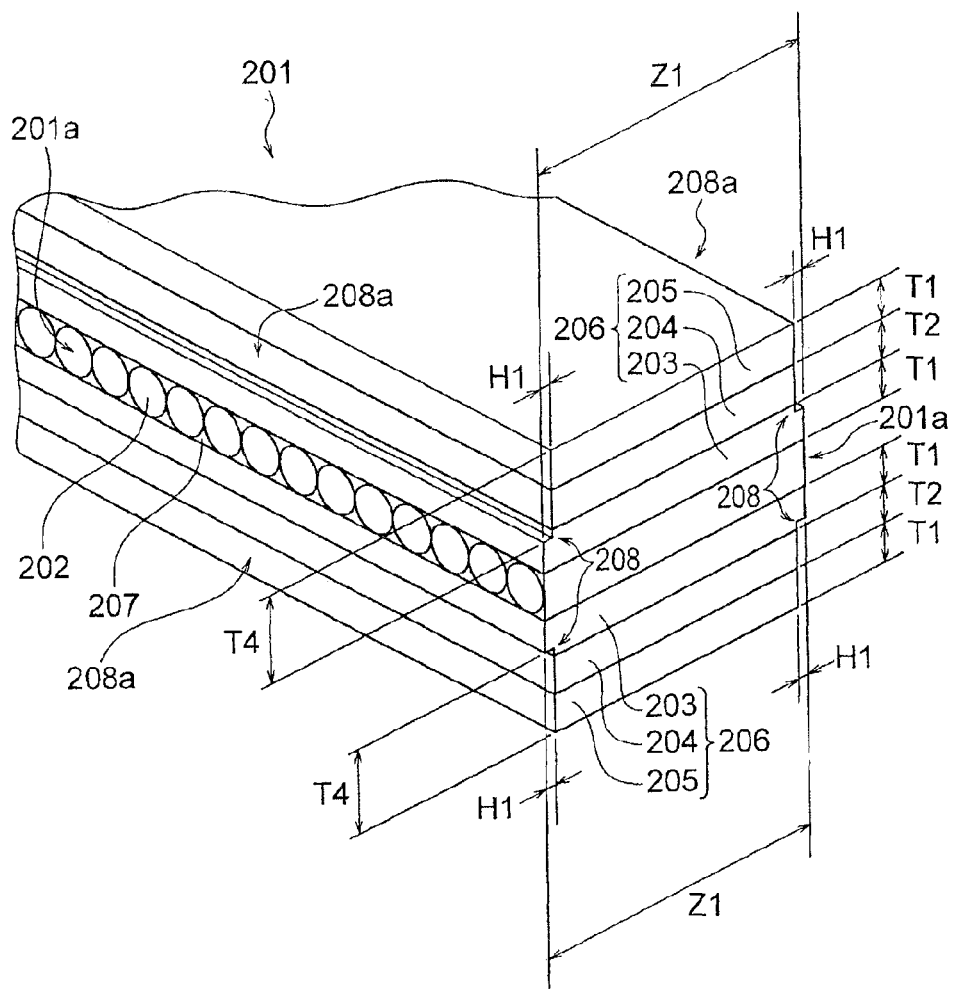
FIG. 10 is an enlarged perspective view of a part of the rod lens array illustrated in FIG. 9.

FIG. 9 is a perspective view of a rod lens array 201 according to a second example embodiment of the invention. FIG. 10 is an enlarged perspective view of a region A7 of the rod lens array 201 illustrated in FIG. 9.

The rod lens array 201 includes a plurality of lenses 202, and hybrid side plates 206 as a pair of side plate sections that interpose side surfaces of the respective lenses 202 in between to hold the lenses 202. The rod lens array 201 according to the second example embodiment differs from the rod lens array 101 of the first example embodiment, in that each of the hybrid side plates 206 as the pair of side plate sections may further include a third side plate 205 disposed on the outer side of the corresponding second side plate 204. Otherwise, the rod lens array 201 according to the second example embodiment may be the same as the rod lens array 101 of the first example embodiment in factors such as: properties of respective components including Vickers hardness, linear expansion coefficient, and water absorption; and a relationship between the components.

A first side plate 203 and the third side plate 205 may be so disposed as to interpose a second side plate 204 in between. The adhesive may be applied between the mutually-adjacent first side plate 203 and second side plate 204 and between the mutually-adjacent second side plate 204 and third side plate 205 for press bonding of the first side plate 203, the second side plate 204, and the third side plate 205.

The first side plate 203 and the third side plate 205 may be made of the same material as each other. Hence, the third side plate 205 may be made of a material having high machinability, i.e., a material easy to be machined. Each of the first side plate 203 and the third side plate 205 may thus have the machinability higher than the machinability of the second side plate 204, i.e., may be easy to be machined as compared with the second side plate 204. In other words, the second side plate 204 may have the machinability lower than the machinability of each of the first side plate 203 and the third side plate 205, i.e., may be difficult to be machined as compared with each of the first side plate 203 and the third side plate 205. The second side plate 204 may have hardness (such as, but not limited to, the Vickers hardness) upon completion of the rod lens array 201 higher than the hardness of each of the first side plate 203 and the third side plate 205, i.e., the second side plate 204 may be harder than the first side plate 203 and the third side plate 205 upon completion of the rod lens array 201. Using the first side plate 203, the second side plate 204, and the third side plate 205 that satisfy such a relationship makes it possible to suppress any deformation (such as, but not limited to, expansion and contraction) that may occur in the longitudinal direction of each of the first side plate 203 and the third side plate 205 as a result of the change in the usage environment including the changes in humidity and temperature. In other words, this makes it possible to reduce stress, occurring at each of the first side plate 203 and the third side plate 205 as a result of the change in the usage environment including the changes in humidity and temperature, by means of the second side plate 204 fixed between the first side plate 203 and the third side plate 205, and thereby to suppress any deformation of the first side plate 203 and the third side plate 205.

Also, the second side plate 204 may be made of a material having a small linear expansion coefficient, and may have the linear expansion coefficient upon completion of the rod lens array 201 smaller than the linear expansion coefficient of each of the first side plate 203 and the third side plate 205. Making the linear expansion coefficient of the second side plate 204 smaller than the linear expansion coefficient of each of the first side plate 203 and the third side plate 205 makes it possible to suppress any deformation (such as, but not limited to, expansion and contraction) that may occur in the longitudinal direction of each of the first side plate 203 and the third side plate 205 as a result of the change in the usage environment including the changes in humidity and temperature. In other words, making the linear expansion coefficient of the second side plate 204 smaller than the linear expansion coefficient of each of the first side plate 203 and the third side plate 205 makes it possible to reduce the stress, occurring at each of the first side plate 203 and the third side plate 205 as a result of the change in the usage environment including the changes in humidity and temperature, by means of the second side plate 204 fixed between the first side plate 203 and the third side plate 205, and thereby to suppress any deformation of the first side plate 203 and the third side plate 205.

Hence, for the first side plate 203, the second side plate 204, and the third side plate 205 that structure each of the hybrid side plates 206, causing the machinability of the second side plate 204 to be lower than the machinability of each of the first side plate 203 and the third side plate 205 and causing the linear expansion coefficient of the second side plate 204 to be smaller than the linear expansion coefficient of each of the first side plate 203 and the third side plate 205 make it possible to make variation in dimension of the rod lens array 201 small irrespective of the change in the usage environment including the changes in humidity and temperature.

The first side plate 203 and the third side plate 205 may preferably have the same thickness as each other. Also, the pair of hybrid side plates 206 may preferably have the same thickness as each other. Referring to an example illustrated in FIG. 10, the first side plate 203 and the third side plate 205 each may have the thickness of T1. The thickness T1 of each of the first side plate 203 and the third side plate 205 may preferably be smaller than the thickness T2 of the second side plate 204. In other words, making the thickness T1 smaller than the thickness T2 (T1<T2) allows an influence of stress, occurring at each of the first side plate 203 and the third side plate 205 as a result of the change in the usage environment including the changes in humidity and temperature, to be small and thereby allows for a reduction in deformation of each of the first side plate 203 and the third side plate 205. More specifically, satisfying the relationship of T1<T2 makes it possible to reduce an influence of linear expansion of each of the first side plate 203 and the third side plate 205 (such as, but not limited to, warpage that occurs in the longitudinal direction of each of the first side plate 203 and the third side plate 205) by means of the second side plate 204 fixed between the first side plate 203 and the third side plate 205, and thereby to suppress any deformation of the first side plate 203 and the third side plate 205.

As illustrated in FIG. 10, both ends of each of the first side plates 203, in the optical axis direction of each of the lenses 202 (i.e., the transverse direction of the first side plates 203), each may be provided with a step 208 that serves as a step section. Providing the step 208 may result in formation of a second principal surface 208a in the longitudinal direction of the rod lens array 201. The second principal surface 208a may be defined by a part of a tip of each of the first side plates 203 in the transverse direction, a surface located at a tip of each of the second side plates 204 in the transverse direction, and a surface located at a tip of each of the third side plates 205 in the transverse direction. The second principal surface 208a may have a width of T4 as illustrated in FIG. 10.

The rod lens array 201 according to the second example embodiment may be the same in factors (such as: properties of respective components including Vickers hardness, linear expansion coefficient, and water absorption; and a relationship between the components) as the rod lens array 101 of the first example embodiment with the exception of the foregoing aspects. Hence, it is possible for the rod lens array 201 according to the second example embodiment to achieve effects similar to those achieved by the rod lens array 101 of the first example embodiment.

Also, the first side plate 203 and the third side plate 205 made of the same material and having the same thickness as each other are fixed on both sides of the second side plate 204 in the rod lens array 201 according to the second example embodiment. Thus, in addition to achievement of the effects similar to those achieved by the rod lens array 101 of the first example embodiment, the rod lens array 201 according to the second example embodiment makes it possible to suppress warpage resulting from a stress difference between the first side plate 203 and the second side plate 204 and a stress difference between the third side plate 205 and the second side plate 204 and to allow an amount of warpage of the finished hybrid side plate 206 alone to be kept small. Hence, so disposing the hybrid side plates 206 as a pair, having the same thickness as each other, on both sides of the rod lens array 201 as to be line symmetric with respect to the arrayed lenses 202 as an axis of symmetry makes it possible to keep an amount of warpage of the finished rod lens array 201 small stably.

Moreover, the hybrid side plates 206 of the rod lens array 201 are each so configured that the first side plate 203 having the high machinability and the third side plate 205 made of the same material and having the same thickness as the first side plate 203 interpose in between the second side plate 204 having the small linear expansion coefficient. This makes it possible to make the variation in dimension, resulting from the change in temperature attributed to, for example but not limited to, surrounding environment or spontaneous heat generation, from the change in humidity, or from a change in any other factor, of the rod lens array 201 small, and thereby to increase resistance to the stress occurring at the hybrid side plates 206.

The rod lens array 201 according to the foregoing second example embodiment makes it possible make the variation in dimension small irrespective of the change in the usage environment such as, but not limited to, the change in humidity, the change in temperature, or the change in any other factor.

[Method of Manufacturing Rod Lens Array 201]

A method of manufacturing the rod lens array 201 according to the second example embodiment differs from the method of manufacturing the rod lens array 101 of the first example embodiment, in that the third side plate 205 may be further disposed on the outer side of each of the second side plate 204, and the first side plate 203 and the third side plate 205 may be so disposed as to interpose the corresponding second side plate 204 in between. Also, the method of manufacturing the rod lens array 201 according to the second example embodiment differs therefrom in that the adhesive may be applied between the mutually-adjacent first side plate 203 and second side plate 204 and between the mutually-adjacent second side plate 204 and third side plate 205 for the press bonding to thereby fabricate in advance the two hybrid side plates 206. Otherwise, the method of manufacturing the rod lens array 201 according to the second example embodiment may be the same as the method of manufacturing the rod lens array 101 of the first example embodiment.

The method of manufacturing the rod lens array 201 according to the second example embodiment may be the same as the method of manufacturing the rod lens array 101 of the first example embodiment with the exception of the foregoing aspects. Hence, it is possible for the method of manufacturing the rod lens array 201 according to the second example embodiment to achieve effects similar to those achieved by the method of manufacturing the rod lens array 101 of the first example embodiment.

[Third Example Embodiment]
[Configuration of Rod Lens Array 301]

Figure 11:
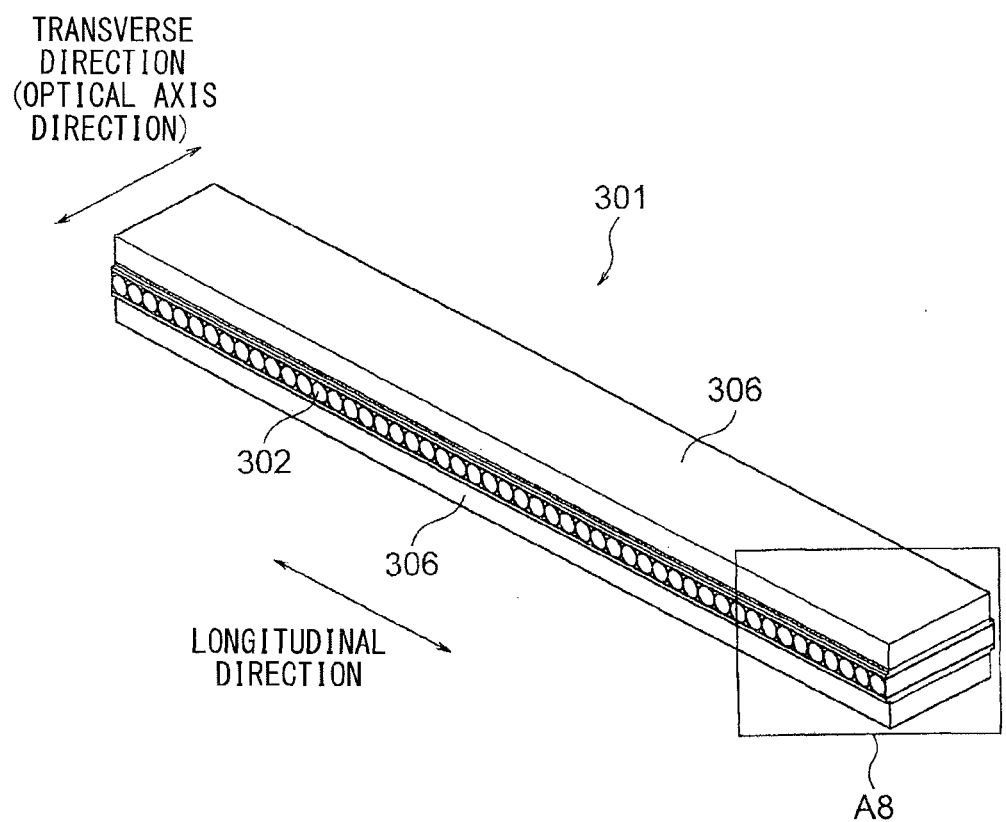
FIG. 11 is a perspective view of a rod lens array according to a third example embodiment of the invention.
Figure 12:
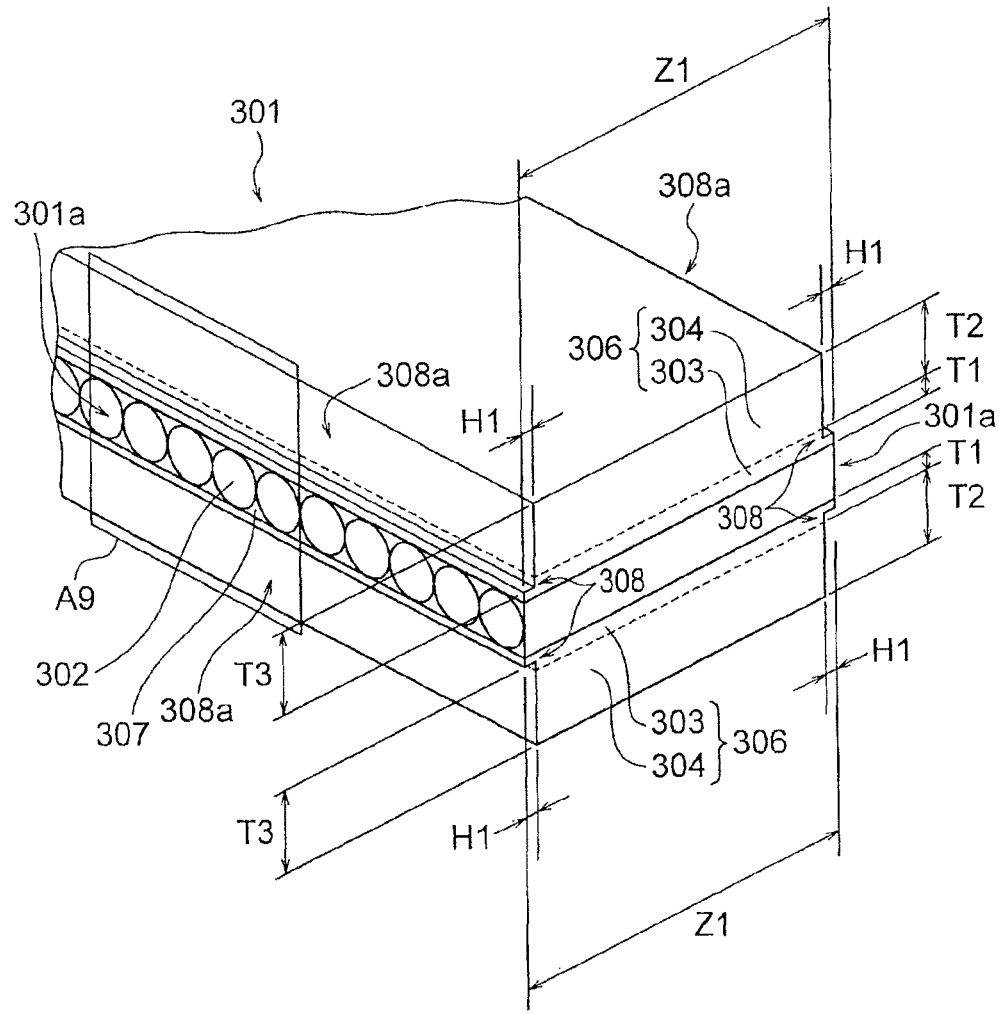
FIG. 12 is an enlarged perspective view of a part of the rod lens array illustrated in FIG. 11.
Figure 13:
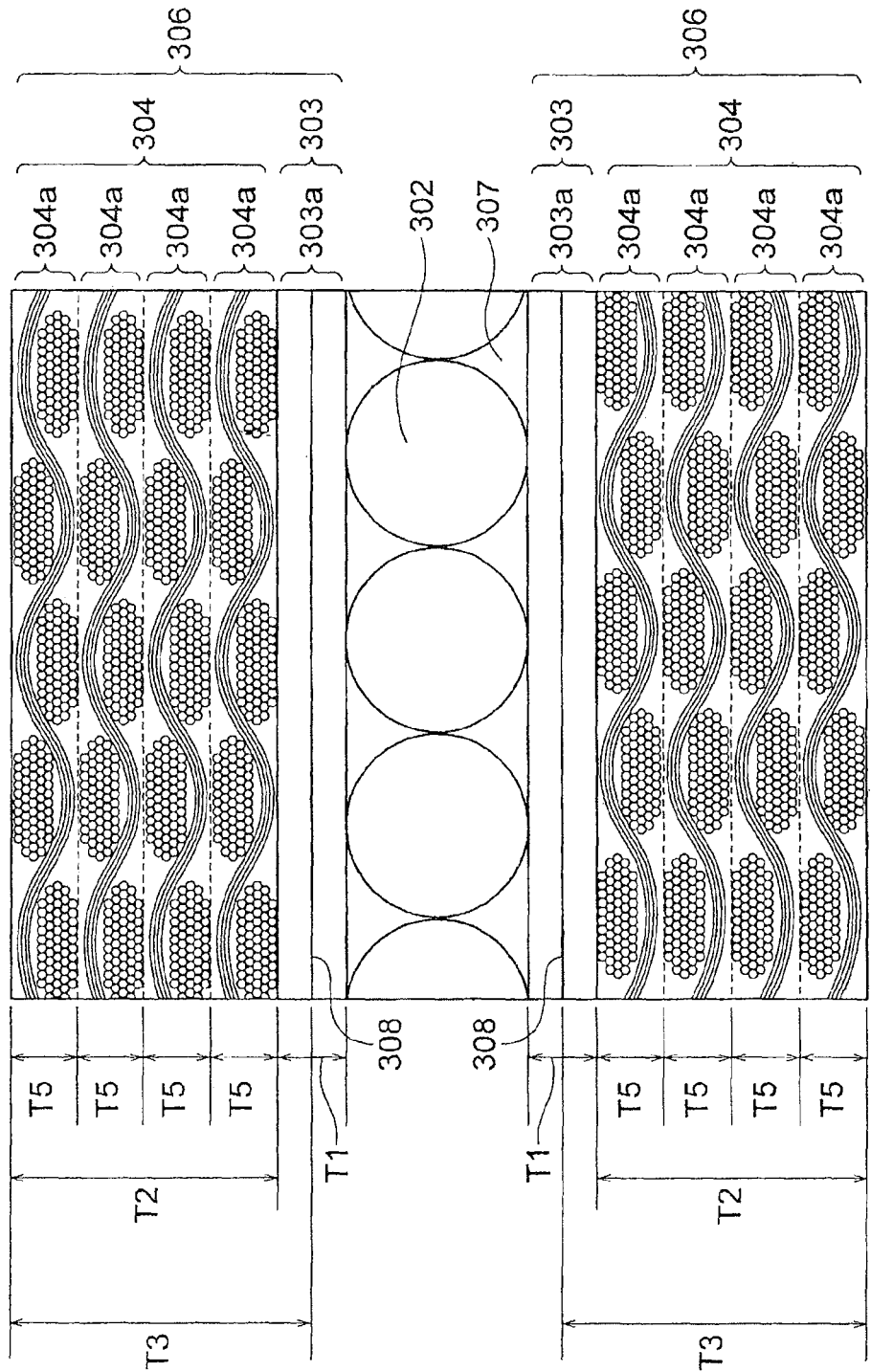
FIG. 13 is an enlarged side view of a structure in a part of the rod lens array illustrated in FIG. 12.

FIG. 11 is a perspective view of a rod lens array 301 according to a third example embodiment of the invention. FIG. 12 is an enlarged perspective view of a region A8 of the rod lens array 301 illustrated in FIG. 11, in which a broken line illustrated in FIG. 12 denotes a boundary between a first side plate 303 and a second side plate 304. FIG. 13 is an enlarged side view of a structure in a region A9 of the rod lens array 301 illustrated in FIG. 12.

The rod lens array 301 includes a plurality of lenses 302, and hybrid side plates 306 as a pair of side plate sections that interpose side surfaces of the respective lenses 302 in between to hold the lenses 302. The rod lens array 301 according to the third example embodiment differs from the rod lens array 101 of the first example embodiment, in that the first side plate 303 and the second side plate 304 structuring each of the hybrid side plates 306 as the pair of side plate sections may be made of respective materials different from the materials of the respective first side plate 103 and second side plate 104 structuring each of the hybrid side plates 106 of the rod lens array 101 of the first example embodiment. Otherwise, the rod lens array 301 according to the third example embodiment may be the same as the rod lens array 101 of the first example embodiment.

The first side plate 303 and the second side plate 304 structuring each of the hybrid side plates 306 each may contain a prepreg as a major constituent material, but may be different from each other in characteristics. In an example illustrated in FIGS. 11, 12, and 13, the first side plate 303 may be made of a first prepreg 303a as a material having high machinability, and may have machinability higher than machinability of the second side plate 304, i.e., easier to be machined than the second side plate 304. In other words, the second side plate 304 may have the machinability lower than the machinability of the first side plate 303, i.e., may be difficult to be machined as compared with the first side plate 303. The second side plate 304 may be made of a second prepreg 304a as a material having a small linear expansion coefficient. The first side plate 303 and the second side plate 304 may be subjected to pressing in a mutually-stacked fashion while the first side plate 303 and the second side plate 304 are semi-cured, and may be subjected to baking at a temperature ranging from 170° C. to 180° C. without limitation to structure each of the hybrid side plates 306 each formed as a single plate member.

The first side plate 303 may be made of a prepreg such as, but not limited to, a prepreg configured of an epoxy resin and a prepreg configured of a phenol resin. A thickness of the single first prepreg 303a may be any thickness in a range from 0.06 mm to 0.2 mm without limitation. The second side plate 304 may be made of a prepreg such as, but not limited to, a prepreg configured of a glass epoxy resin. A thickness T5 of the single second prepreg 304a may be any thickness in a range from 0.06 mm to 0.2 mm without limitation. FIG. 13 illustrates an example where the first side plate 303 includes one first prepreg 303a and the second side plate 304 includes four mutually-stacked second prepregs 304a.

Although FIG. 13 illustrates one example in which one layer of first prepreg 303a is provided for the first prepreg 303a structuring the first side plate 303 and four layers of second prepregs 304a are provided for the second prepreg 304a structuring the second side plate 304, a combination of stacks of layers is not limited thereto. For example, two or more layers of first prepregs 303a may be provided for the first prepreg 303a structuring the first side plate 303 and one layer of second prepreg 304a may be provided for the second prepreg 304a structuring the second side plate 304. The pair of hybrid side plates 306 interposing the lenses 302 in between may preferably have the same thickness as each other. Causing the pair of hybrid side plates 306 to have the same thickness as each other causes the pair of hybrid side plates 306, disposed with the lenses 302 provided in between, to offset each other stresses that occur at the respective hybrid side plates 306 as a result of the change in the usage environment including the changes in humidity and temperature, and thereby makes it possible to cancel out the stress by means of the rod lens array 301 as a whole. Hence, it is possible to suppress any deformation (such as, but not limited to, warpage) that occurs in the longitudinal direction of the rod lens array 301.

As illustrated in FIG. 12, both ends of each of the first side plates 303, in the optical axis direction of each of the lenses 302 (i.e., the transverse direction of the first side plates 303), each may be provided with a step 308 that serves as a step section. Providing the step 308 may result in formation of a second principal surface 308a in the longitudinal direction of the rod lens array 301. The second principal surface 308a may be defined by a part of a tip of each of the first side plates 303 in the transverse direction and a surface located at a tip of each of the second side plates 304 in the transverse direction. The second principal surface 308a may have the width of T3 as illustrated in FIG. 12.

The rod lens array 301 according to the third example embodiment may be the same in factors (such as: properties of respective components including Vickers hardness, linear expansion coefficient, and water absorption; and a relationship between the components) as the rod lens array 101 of the first example embodiment with the exception of the foregoing aspects. Hence, it is possible for the rod lens array 301 according to the third example embodiment to achieve effects similar to those achieved by the rod lens array 101 of the first example embodiment.

Also, two types of prepregs that are different from each other in characteristics, i.e., the first prepreg 303a and the second prepreg 304a, may be used for the first side plate 303 and the second side plate 304 in the rod lens array 301 according to the third example embodiment. Further, a stack of such first and second prepregs 303a and 304a may be subjected to pressing and baking to be used as a single member (i.e., the hybrid side plate 306) in which the first side plate 303 and the second side plate 304 are integrated. Thus, in addition to achievement of the effects similar to those achieved by the rod lens array 101 of the first example embodiment, the third example embodiment makes it possible to configure the rod lens array 301 having high resistance to the stress occurring at the hybrid side plates 306, and also to make a variation in thickness of each of the hybrid side plates 306 small as compared with hybrid side plates in each of which two kinds of different plate members are press bonded with use of an adhesive.

Further, use of a prepreg sheet for each of the first side plate 303 and the second side plate 304 allows for, for example but not limited to, selection of thickness (sheet thickness) of each of the single first prepreg 303a and the single second prepreg 304a in a non-limiting range from 0.06 mm to 0.2 mm on an as-needed basis. Hence, as compared with an example in which a material not suitable for stacking by means of pressing and baking is used (e.g., a material that requires press bonding with use of an adhesive), it is possible to make a thickness of the hybrid side plate 306 small as a whole while maintaining strength of the hybrid side plate 306.

The rod lens array 301 according to the foregoing third example embodiment makes it possible make the variation in dimension small irrespective of the change in the usage environment such as, but not limited to, the change in humidity, the change in temperature, or the change in any other factor.

[Method of Manufacturing Rod Lens Array 301]

A method of manufacturing the rod lens array 301 according to the third example embodiment differs from the method of manufacturing the rod lens array 101 of the first example embodiment in a fabrication method of each of the hybrid side plates 306 in the rod lens array 301. More specifically, the method of manufacturing the rod lens array 301 according to the third example embodiment differs therefrom in that the first side plate 303 may use the first prepreg 303a and the second side plate 304 may use the second prepreg 304a, and the first prepreg 303a and the second prepreg 304a may be pressed while the semi-cured first and second prepregs 303a and 304a are stacked and baked at a temperature ranging from 170° C. to 180° C. without limitation to fabricate each of the hybrid side plates 306 each formed as a single plate member. Otherwise, the method of manufacturing the rod lens array 301 according to the third example embodiment may be the same as the method of manufacturing the rod lens array 101 of the first example embodiment.

The method of manufacturing the rod lens array 301 according to the third example embodiment may be the same as the method of manufacturing the rod lens array 101 of the first example embodiment with the exception of the foregoing aspects. Hence, it is possible for the method of manufacturing the rod lens array 301 according to the third example embodiment to achieve effects similar to those achieved by the method of manufacturing the rod lens array 101 of the first example embodiment.

Also, the pressing may be performed while the semi-cured first and second prepregs 303a and 304a are stacked followed by the baking performed at a temperature ranging from 170° C. to 180° C. without limitation to thereby fabricate each of the hybrid side plates 306 each formed as a single plate member, in the method of manufacturing the rod lens array 301 according to the third example embodiment. Thus, in addition to achievement of the effects similar to those achieved by the rod lens array 101 of the first example embodiment, the method of manufacturing the rod lens array 301 according to the third example embodiment makes it possible to simplify a manufacturing process as compared with an example in which two kinds of different plate members are press bonded with use of an adhesive to fabricate each hybrid side plate.

Further, the use of the prepreg sheet for each of the first side plate 303 and the second side plate 304 allows for, for example but not limited to, the selection of thickness of each of the single first prepreg 303a and the single second prepreg 304a in a non-limiting range from 0.06 mm to 0.2 mm on an as-needed basis. Hence, as compared with an example in which a material not suitable for stacking by means of pressing and baking is used (e.g., a material that requires press bonding with use of an adhesive), it is possible to make a thickness of the hybrid side plate 306 small as a whole while maintaining strength of the hybrid side plate 306, and further to make a variation in thickness of each of the hybrid side plates 306 small.

[Fourth Example Embodiment]
[Configuration of Rod Lens Array 401]

Figure 14:
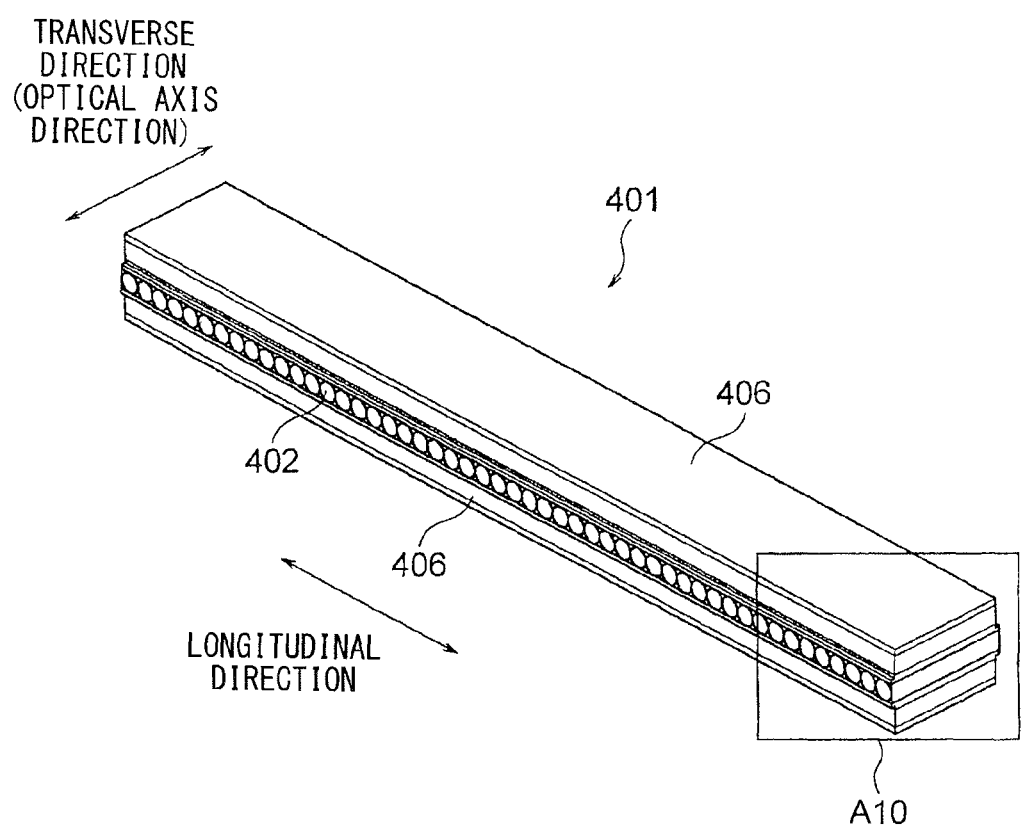
FIG. 14 is a perspective view of a rod lens array according to a fourth example embodiment of the invention.
Figure 15:
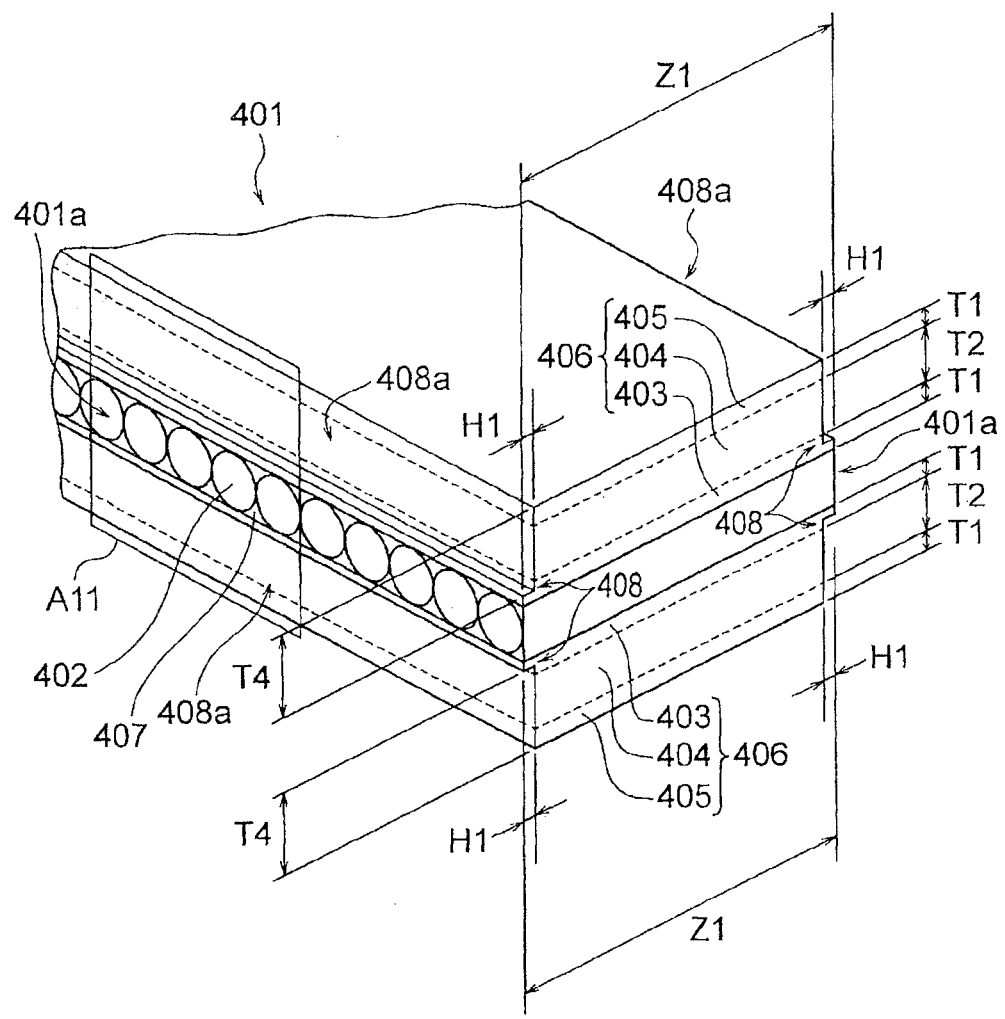
FIG. 15 is an enlarged perspective view of a part of the rod lens array illustrated in FIG. 14.
Figure 16:
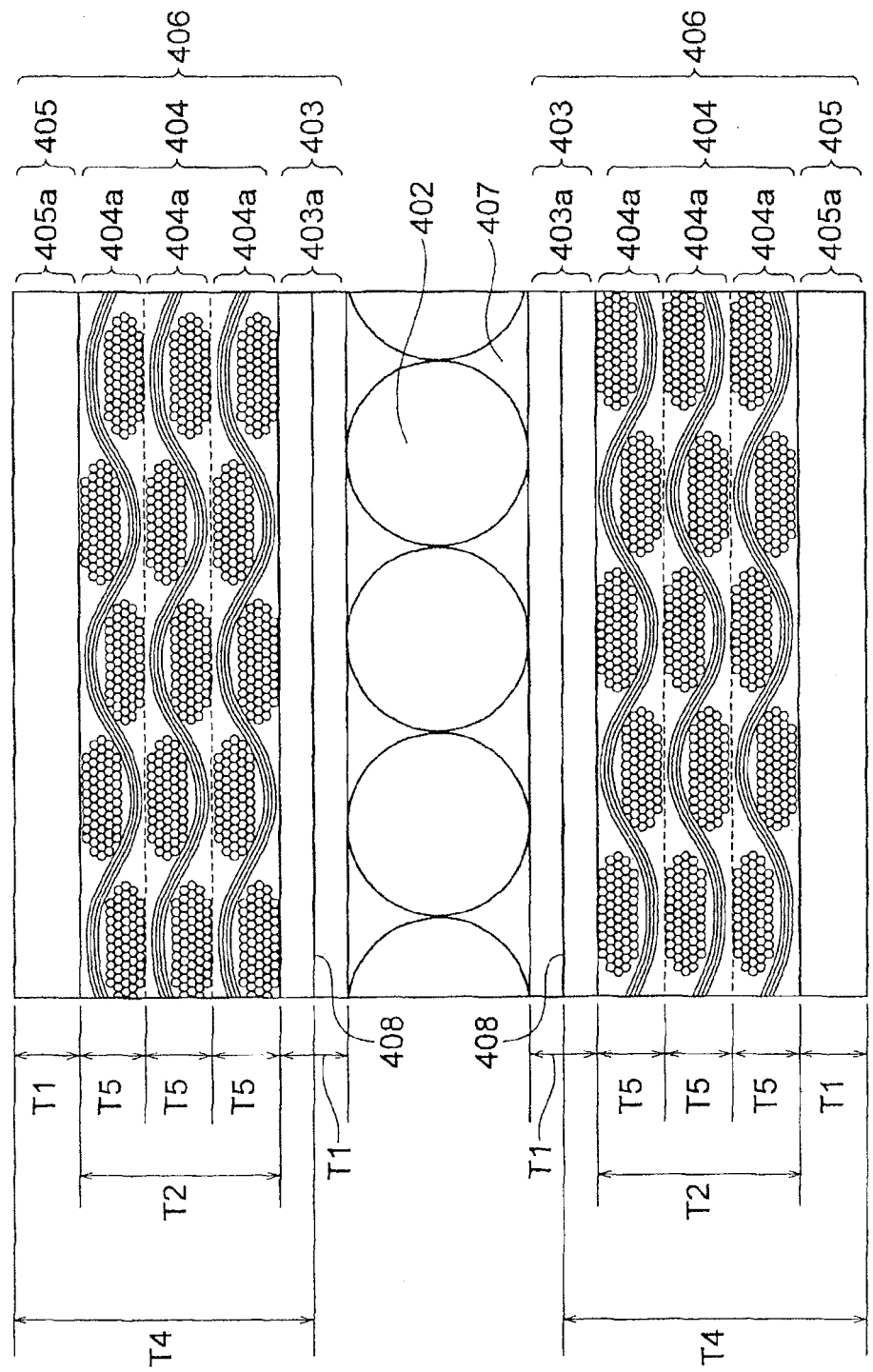
FIG. 16 is an enlarged side view of a structure in a part of the rod lens array illustrated in FIG. 15.

FIG. 14 is a perspective view of a rod lens array 401 according to a fourth example embodiment of the invention. FIG. 15 is an enlarged perspective view of a region A10 of the rod lens array 401 illustrated in FIG. 14, in which broken lines illustrated in FIG. 15 denote a boundary between a first side plate 403 and a second side plate 404 and a boundary between the second side plate 404 and a third side plate 405. FIG. 16 is an enlarged side view of a structure in a region A11 of the rod lens array 401 illustrated in FIG. 15.

The rod lens array 401 according to the fourth example embodiment includes a plurality of lenses 402, and hybrid side plates 406 as a pair of side plate sections that interpose side surfaces of the respective lenses 402 in between to hold the lenses 402. The rod lens array 401 according to the fourth example embodiment differs from the rod lens array 301 of the third example embodiment, in that each of the hybrid side plates 406 as the pair of side plate sections may further include a third side plate 405 disposed on the outer side of the corresponding second side plate 404. Otherwise, the rod lens array 401 according to the fourth example embodiment may be the same as the rod lens array 301 of the third example embodiment. Also, the rod lens array 401 according to the fourth example embodiment differs from the rod lens array 201 of the second example embodiment, in that the first side plate 403, the second side plate 404, and the third side plate 405 structuring each of the hybrid side plates 406 as the pair of side plate sections may be made of respective materials different from the materials of the respective first side plate 203, second side plate 204, and third side plate 205 structuring each of the hybrid side plates 206 of the rod lens array 201 of the second example embodiment. Otherwise, the rod lens array 401 according to the fourth example embodiment may be the same as the rod lens array 201 of the second example embodiment.

The first side plate 403, the second side plate 404, and the third side plate 405 structuring each of the hybrid side plates 406 each may contain a prepreg as a major constituent material. In an example illustrated in FIGS. 14, 15, and 16, the first side plate 403 may be made of a first prepreg 403a as a material having high machinability, the second side plate 404 may be made of a second prepreg 404a as a material having a small linear expansion coefficient, and the third side plate 405 may be made of a third prepreg 405a as a material having high machinability. The first side plate 403 and the third side plate 405 may be so disposed as to interpose the second side plate 404 in between. The first side plate 403, the second side plate 404, and the third side plate 405 may be subjected to pressing in a mutually-stacked fashion while the first side plate 403, the second side plate 404, and the third side plate 405 are semi-cured, and may be subjected to baking at a temperature ranging from 170° C.

to 180° C. without limitation to structure each of the hybrid side plates 406 each formed as a single plate member.

The first side plate 403 and the third side plate 405 may be made of the same material as each other. Hence, the first side plate 403 and the third side plate 405 may be the same in characteristics as each other, but may be different in characteristics from the second side plate 404. Each of the first side plate 403 and the third side plate 405 may thus have the machinability higher than the machinability of the second side plate 404, i.e., may be easy to be machined as compared with the second side plate 404. In other words, the second side plate 404 may have the machinability lower than the machinability of each of the first side plate 403 and the third side plate 405, i.e., may be difficult to be machined as compared with each of the first side plate 403 and the third side plate 405.

Each of the first side plate 403 and the third side plate 405 may be made of a prepreg such as, but not limited to, a prepreg configured of an epoxy resin and a prepreg configured of a phenol resin. A thickness of each of the single first prepreg 403a and the single third prepreg 405a may be any thickness in a range from 0.06 mm to 0.2 mm without limitation. The second side plate 404 may be made of a prepreg such as, but not limited to, a prepreg configured of a glass epoxy resin. A thickness T5 of the single second prepreg 404a may be any thickness in a range from 0.06 mm to 0.2 mm without limitation. FIG. 16 illustrates an example where the first side plate 403 includes one first prepreg 403a, the second side plate 404 includes three mutually-stacked second prepregs 404a, and the third side plate 405 includes one third prepreg 405a.

Although FIG. 16 illustrates one example in which one layer of first prepreg 403a is provided for the first prepreg 403a structuring the first side plate 403, three layers of second prepregs 404a are provided for the second prepreg 404a structuring the second side plate 404, and one layer of third prepreg 405a is provided for the third prepreg 405a structuring the third side plate 405, a combination of stacks of layers is not limited thereto. For example, two or more layers of first prepregs 403a may be provided for the first prepreg 403a structuring the first side plate 403, one layer of second prepreg 404a may be provided for the second prepreg 404a structuring the second side plate 404, and two or more layers of third prepregs 405a may be provided for the third prepreg 405a structuring the third side plate 405. Note that the first side plate 403 and the third side plate 405 may have the same number of layers as each other, i.e., the first side plate 403 may have a thickness equal to a thickness of the third side plate 405. The pair of hybrid side plates 406 interposing the lenses 402 in between may preferably have the same thickness as each other. Causing the pair of hybrid side plates 406 to have the same thickness as each other causes the pair of hybrid side plates 406, disposed with the lenses 402 provided in between, to offset each other stresses that occur at the respective hybrid side plates 406 as a result of the change in the usage environment including the changes in humidity and temperature, and thereby makes it possible to cancel out the stress by means of the rod lens array 401 as a whole. Hence, it is possible to suppress any deformation (such as, but not limited to, warpage) that occurs in the longitudinal direction of the rod lens array 401.

As illustrated in FIG. 15, both ends of each of the first side plates 403, in the optical axis direction of each of the lenses 402 (i.e., the transverse direction of the first side plates 403), each may be provided with a step 408 that serves as a step section. Providing the step 408 may result in formation of a second principal surface 408a in the longitudinal direction of the rod lens array 401. The second principal surface 408a may be defined by a part of a tip of each of the first side plates 403 in the transverse direction, a surface located at a tip of each of the second side plates 404 in the transverse direction, and a part of a tip of each of the third side plates 405 in the transverse direction. The second principal surface 408a may have the width of T4 as illustrated in FIG. 15.

The rod lens array 401 according to the fourth example embodiment may be the same in factors (such as: properties of respective components including Vickers hardness, linear expansion coefficient, and water absorption; and a relationship between the components) as each of the rod lens array 201 of the second example embodiment and the rod lens array 301 of the third example embodiment with the exception of the foregoing aspects. Hence, it is possible for the rod lens array 401 according to the fourth example embodiment to achieve effects similar to those achieved by the rod lens array 201 of the second example embodiment and those achieved by the rod lens array 301 of the third example embodiment.

Also, the first side plate 403 and the third side plate 405 made of the same material and having the same thickness as each other are fixed on both sides of the second side plate 404 in the rod lens array 401 according to the fourth example embodiment. Thus, in addition to achievement of the effects similar to those achieved by the rod lens array 301 of the third example embodiment, the rod lens array 401 according to the fourth example embodiment makes it possible to suppress warpage resulting from a stress difference between the first side plate 403 and the second side plate 404 and a stress difference between the third side plate 405 and the second side plate 404 and to allow an amount of warpage of the finished hybrid side plate 406 alone to be kept small. Hence, so disposing the hybrid side plates 406 as a pair, having the same thickness as each other, on both sides of the rod lens array 401 as to be line symmetric with respect to the arrayed lenses 402 as an axis of symmetry makes it possible to keep an amount of warpage of the finished rod lens array 401 small stably.

Moreover, the hybrid side plates 406 of the rod lens array 401 are each so configured that the first side plate 403 having the high machinability and the third side plate 405 made of the same material and having the same thickness as the first side plate 403 interpose in between the second side plate 404 having the small linear expansion coefficient. This makes it possible to make the variation in dimension, resulting from the change in temperature attributed to, for example but not limited to, surrounding environment or spontaneous heat generation, from the change in humidity, or from a change in any other factor, of the rod lens array 401 small, and thereby to increase resistance to the stress occurring at the hybrid side plates 406.

Further, use of a prepreg sheet for each of the first side plate 403, the second side plate 404, and the third side plate 405 allows for, for example but not limited to, selection of thickness (sheet thickness), per prepreg in each of the first side plate 403, the second side plate 404, and the third side plate 405, in a non-limiting range from 0.06 mm to 0.2 mm on an as-needed basis. Hence, in addition to achievement of the effects similar to those achieved by the rod lens array 201 of the second example embodiment, the rod lens array 401 according to the fourth example embodiment makes it possible to make a thickness of the hybrid side plate 406 small as a whole while maintaining strength of the hybrid side plate 406, as compared with an example in which a material not suitable for stacking by means of pressing and baking is used (e.g., a material that requires press bonding with use of an adhesive), it is possible to make a thickness of the hybrid side plate 406 small as a whole while maintaining strength of the hybrid side plate 406.

[Fifth Example Embodiment]

Figure 17:
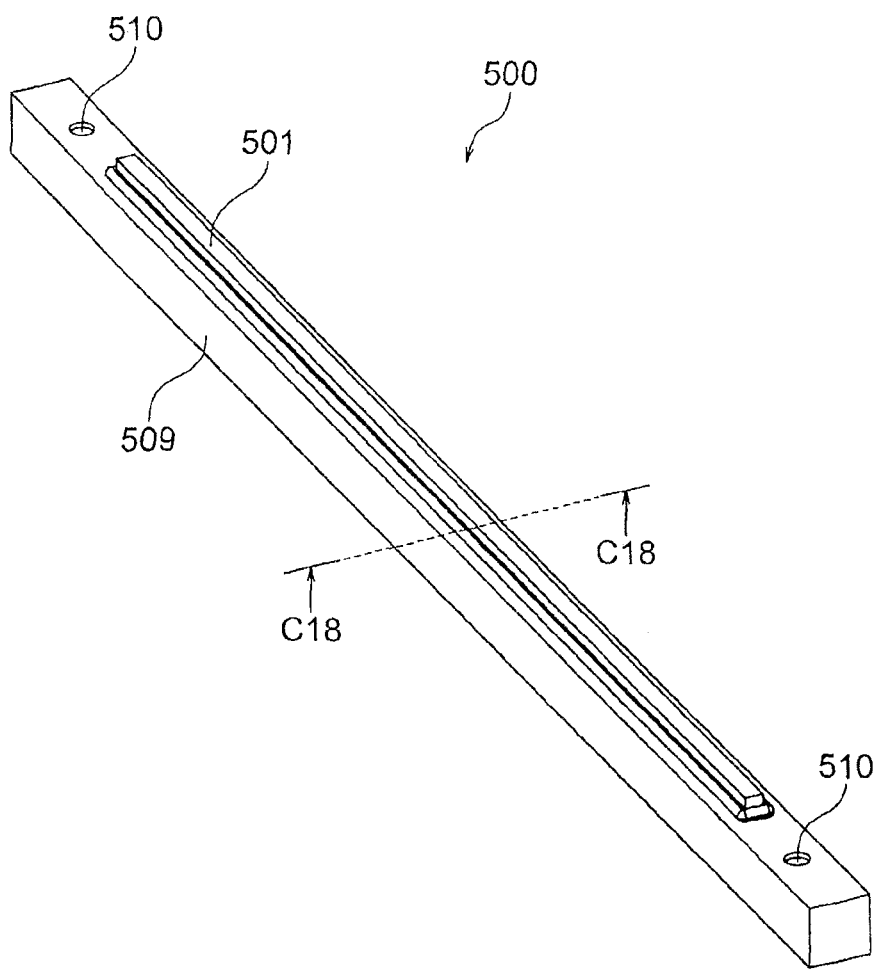
FIG. 17 is a perspective view of an LED print head according to a fifth example embodiment of the invention.
Figure 18:
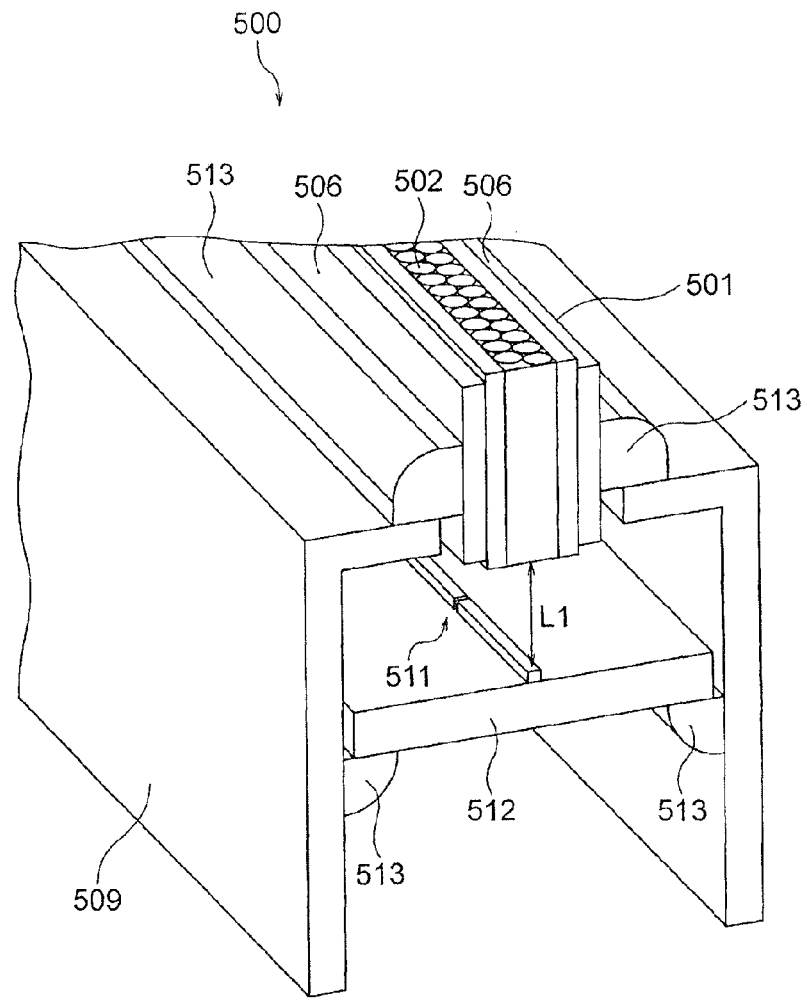
FIG. 18 is an enlarged perspective view of a structure of the LED print head, including a cross-sectional structure taken along line C18-C18 of FIG. 17 of the LED print head illustrated in FIG. 17.

FIG. 17 is a perspective view of an LED print head 500 according to a fifth example embodiment of the invention. FIG. 18 is an enlarged perspective view of a structure of the LED print head 500, including a cross-sectional structure taken along line C18-C18 of FIG. 17 of the LED print head 500 illustrated in FIG. 17. The LED print head 500 may be used as an exposure unit that performs exposure of a surface of a photosensitive drum in an image forming apparatus. The image forming apparatus may be, for example but not limited to, a printer.

The LED print head 500 may include a chip-on-board (COB) 512, a rod lens array 501, and a holder 509. The COB 512 may be a substrate, or a mounting substrate, on which a plurality of semiconductor light-emitting device arrays 511 are arrayed linearly. The holder 509 may hold the rod lens array 501 and the COB 512. Note that a configuration of the semiconductor light-emitting device arrays 511 arranged on the COB 512 is not limited to the linear arrangement. The semiconductor light-emitting device arrays 511 may be arrayed in a staggered arrangement.

The rod lens array 501 includes a plurality of lenses 502, and hybrid side plates 506 as a pair of side plate sections that interpose side surfaces of the respective lenses 502 in between to hold the lenses 502. Any one of the rod lens arrays 101, 201, 301, and 401 described in the first to the fourth example embodiments may be applied to the rod lens array 501. Hence, the lenses 502 illustrated in FIG. 18 may correspond to any one of the lenses 102, 202, 302, and 402 in accordance with any one of the rod lens arrays 101, 201, 301, and 401 applied to the rod lens array 501. Likewise, the hybrid side plates 506 may correspond to any one of the hybrid side plates 106, 206, 306, and 406.

The semiconductor light-emitting device arrays 511 each may be a chip in which a plurality of semiconductor light-emitting elements are arrayed. The semiconductor light-emitting elements each may be, for example but not limited to, a light-emitting diode (LED). The chip may be, for example but not limited to, an LED array chip. The rod lens array 501 and the COB 512 may be bonded to the holder 509 by an adhesive such as, but not limited to, an ultraviolet-curable adhesive. The rod lens array 501 and the COB 512 each may be so fixed to the holder 509 that light-emission surfaces of the respective semiconductor light-emitting device arrays 511 are located at their respective positions separated, by a focal distance of the lenses 502, from the lenses 502 provided in the rod lens array 501. In other words, the rod lens array 501 and the COB 512 may be fixed to the holder 509 at respective positions at which a distance L1 from surfaces in an optical axis direction of the respective lenses 502 to the light-emission surfaces of the respective semiconductor light-emitting device arrays 511 is equal to the focal distance of the lenses 502. Also, the rod lens array 501 may be preferably so bonded to the holder 509 that a distance from the surfaces in the optical axis direction of the respective lenses 502 to a surface of the photosensitive drum is equal to the foal distance of the lenses 502, in an example where the LED print head 500 is incorporated in the image forming apparatus including the printer.

The holder 509 may have holes 510 at predetermined positions on an upper surface of the holder 509 near both ends in the longitudinal direction of the holder 509. The holes 509 each may serve as a positioning section, and may The rod lens array 401 according to the foregoing fourth example embodiment makes it possible make the variation in dimension small irrespective of the change in the usage environment such as, but not limited to, the change in humidity, the change in temperature, or the change in any other factor.

[Method of Manufacturing Rod Lens Array 401]

A method of manufacturing the rod lens array 401 according to the fourth example embodiment differs from the method of manufacturing the rod lens array 101 of the first example embodiment in a fabrication method of each of the hybrid side plates 406 in the rod lens array 401. More specifically, the method of manufacturing the rod lens array 401 according to the fourth example embodiment differs therefrom in that the first side plate 403 may use the first prepreg 403a, the second side plate 404 may use the second prepreg 404a, and the third side plate 405 may use the third prepreg 405a. Further, the method of manufacturing the rod lens array 401 according to the fourth example embodiment differs therefrom in that the first side plate 403 and the third side plate 405 may be so disposed as to interpose the second side plate 404 in between, and the first side plate 403, the second side plate 404, and the third side plate 405 may be pressed while the semi-cured first, second, and third plates 403, 404, and 405 are stacked and baked at a temperature ranging from 170° C. to 180° C. without limitation to fabricate each of the hybrid side plates 406 each formed as a single plate member. Otherwise, the method of manufacturing the rod lens array 401 according to the fourth example embodiment may be the same as the method of manufacturing the rod lens array 101 of the first example embodiment.

The method of manufacturing the rod lens array 401 according to the fourth example embodiment may be the same as the method of manufacturing the rod lens array 101 of the first example embodiment with the exception of the foregoing aspects. Hence, it is possible for the method of manufacturing the rod lens array 401 according to the fourth example embodiment to achieve effects similar to those achieved by the method of manufacturing the rod lens array 101 of the first example embodiment.

Also, the pressing may be performed while the semi-cured first, second, and third prepregs 403a, 404a, and 405a are stacked followed by the baking performed at a temperature ranging from 170° C. to 180° C. without limitation to thereby fabricate each of the hybrid side plates 406 each formed as a single plate member, in the method of manufacturing the rod lens array 401 according to the fourth example embodiment. Thus, in addition to achievement of the effects similar to those achieved by the rod lens array 101 of the first example embodiment, the method of manufacturing the rod lens array 401 according to the fourth example embodiment makes it possible to simplify a manufacturing process as compared with an example in which two kinds of different plate members are press bonded with use of an adhesive to fabricate each hybrid side plate.

Further, the use of the prepreg sheet for each of the first side plate 403, the second side plate 404, and the third side plate 405 allows for, for example but not limited to, the selection of thickness, per prepreg in each of the first side plate 403, the second side plate 404, and the third side plate 405, in a non-limiting range from 0.06 mm to 0.2 mm on an as-needed basis. Hence, as compared with an example in which a material not suitable for stacking by means of be used, for example, to perform positioning for determining a position of the LED print head 500 relative to a printer body structure upon mounting the LED print head 500 to the image forming apparatus including the printer.

Sealants 513 may be provided at a gap between the rod lens array 501 and the holder 509 and a gap between the COB 512 and the holder 509, and adapted to prevent entry of any foreign substance such as, but not limited to, a toner into the holder 509. The sealants 513 may be made of a material such as, but not limited to, silicone.

The LED print head 500 performs exposure of an irradiated surface (e.g., the surface of the photosensitive drum) by causing light emitted from each of the semiconductor light-emitting device arrays 511 to be collected by the rod lens array 501 and irradiating the irradiated surface with the light collected by the rod lens array 501. In the non-limiting example where the LED print head 500 is provided in the image forming apparatus including the printer, the LED print head 500 may irradiate the surface of the photosensitive drum with light that corresponds to image data supplied to the image forming apparatus to form an electrostatic latent image on the surface of the photosensitive drum.

Any one of the rod lens arrays 101, 201, 301, and 401 described in the first to the fourth example embodiments may be applied to the rod lens array 501 in the LED print head 500 according to the fifth example embodiment. Hence, it is possible to suppress a variation in relative positional relationship between the rod lens array 501 and the semiconductor light-emitting device arrays 511, irrespective of a change in usage environment such as, but not limited to: a change in humidity; a change in temperature attributed to, for example but not limited to, spontaneous heat generation derived from the COB 512; or a change in any other factor.

Hence, it is possible for the LED print head 500 according to the fifth example embodiment to achieve stable light illumination performance irrespective of the change in usage environment including the changes in humidity and temperature.

[Sixth Example Embodiment]

Figure 19:
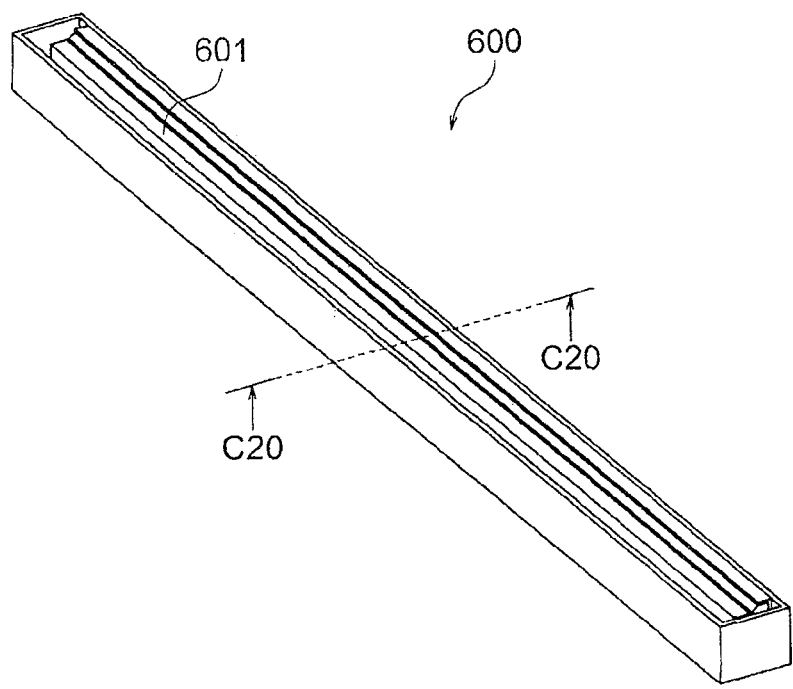
FIG. 19 is a perspective view of a contact image sensor head according to a sixth example embodiment of the invention.
Figure 20:
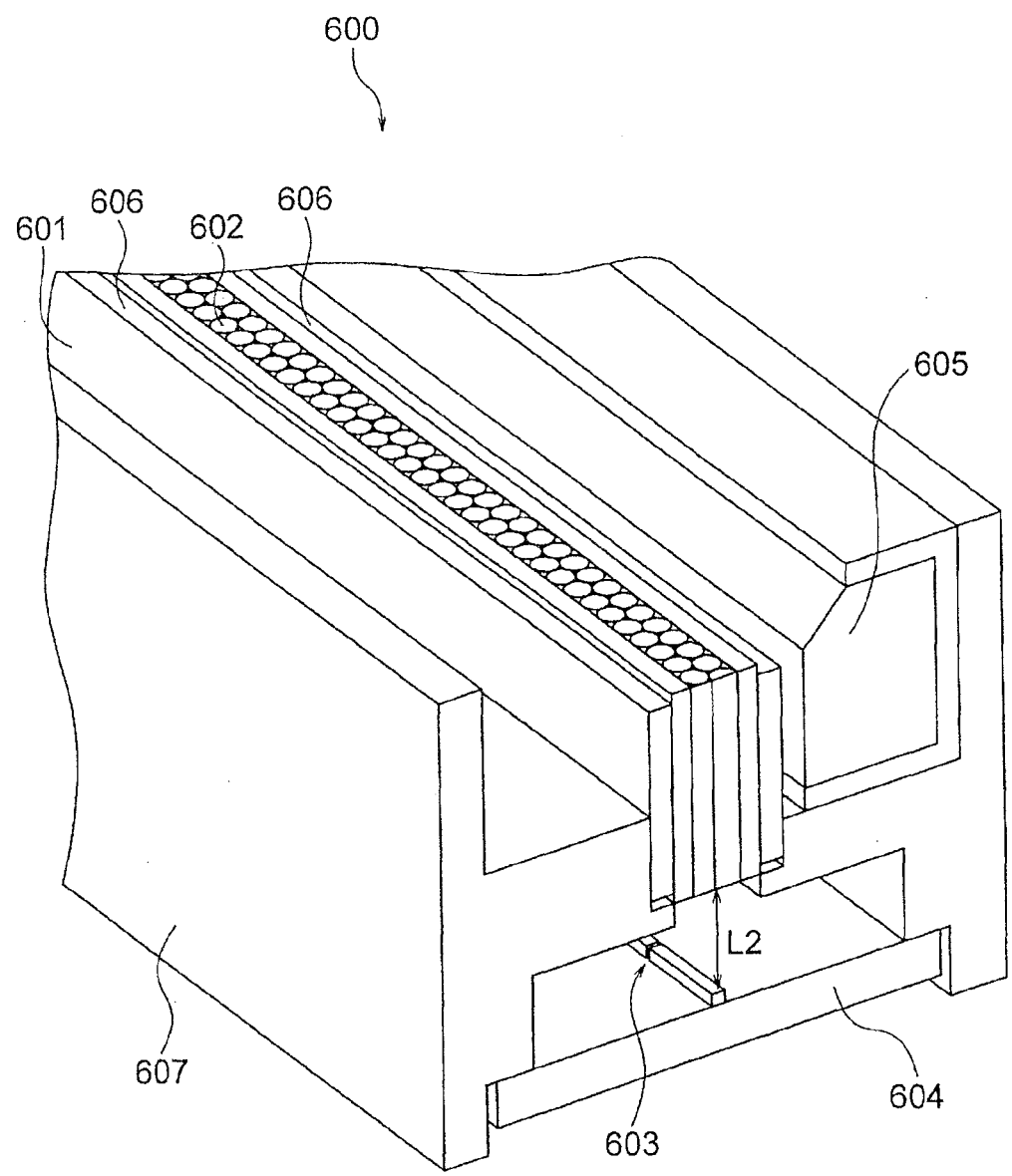
FIG. 20 is an enlarged perspective view of a structure of the contact image sensor head, including a cross-sectional structure taken along line C20-C20 of FIG. 19 of the contact image sensor head illustrated in FIG. 19.

FIG. 19 is a perspective view of a contact image sensor head 600 according to a sixth example embodiment of the invention. FIG. 20 is an enlarged perspective view of a structure of the contact image sensor head 600, including a cross-sectional structure taken along line C20-C20 of FIG. 19 of the contact image sensor head 600 illustrated in FIG. 19. The contact image sensor head 600 may be used as a reading section in an image reading apparatus. The reading section may irradiate a medium such as, but not limited to, a document with light to receive light reflected from the medium. The image reading apparatus may be, for example but not limited to, an image scanner.

The contact image sensor head 600 may include a chip-on-board (COB) 604, a light guide member 605, a rod lens array 601, and a holder 607. The COB 604 may be a substrate, or a mounting substrate, on which a plurality of semiconductor light-receiving device arrays 603 are arrayed linearly. The light guide member 605 may include a light source provided therein. The holder 607 may hold the rod lens array 601 and the COB 604.

The rod lens array 601 includes a plurality of lenses 602, and hybrid side plates 606 as a pair of side plate sections that interpose side surfaces of the respective lenses 602 in between to hold the lenses 602. Any one of the rod lens arrays 101, 201, 301, and 401 described in the first to the fourth example embodiments may be applied to the rod lens array 601. Hence, the lenses 602 illustrated in FIG. 20 may correspond to any one of the lenses 102, 202, 302, and 402 in accordance with any one of the rod lens arrays 101, 201, 301, and 401 applied to the rod lens array 601. Likewise, the hybrid side plates 606 may correspond to any one of the hybrid side plates 106, 206, 306, and 406.

The semiconductor light-receiving device arrays 603 each may be a chip in which a plurality of semiconductor light-receiving elements are arrayed. The semiconductor light-receiving elements each may sense the light reflected from the medium including the document and convert the reflected light into an electric signal. The rod lens array 601 and the COB 604 may be bonded to the holder 607 by an adhesive such as, but not limited to, an ultraviolet-curable adhesive. The rod lens array 601 and the COB 604 each may be so fixed to the holder 607 that light-reception surfaces of the respective semiconductor light-receiving device arrays 603 are located at their respective positions separated, by a focal distance of the lenses 602, from the lenses 602 provided in the rod lens array 601. In other words, the rod lens array 601 and the COB 604 may be fixed to the holder 607 at respective positions at which a distance L2 from surfaces in an optical axis direction of the respective lenses 602 to the light-reception surfaces of the respective semiconductor light-receiving device arrays 603 is equal to the focal distance of the lenses 602. Also, the rod lens array 601 may be preferably so bonded to the holder 607 that a distance from the surfaces in the optical axis direction of the respective lenses 602 to the document placed on a document table is equal to the foal distance of the lenses 602, in an example where the contact image sensor head 600 is incorporated in the image reading apparatus including a scanner.

Note that the contact image sensor head 600 is not limited to an example illustrated in FIG. 20. For example, sealants adapted to prevent entry of any foreign substance such as, but not limited to, dust into the holder 607 may be provided at a gap between the rod lens array 601 and the holder 607 and a gap between the COB 604 and the holder 607. The sealants may be made of a material such as, but not limited to, silicone.

In the non-limiting example where the contact image sensor head 600 is provided in the image reading apparatus including the scanner, the light source provided inside the light guide member 605 may emit light, and the rod lens array 601 may collect the light reflected from the document. Further, the semiconductor light-receiving device arrays 603 may receive the reflected light collected by the rod lens array 601, thereby performing reading of the document.

Any one of the rod lens arrays 101, 201, 301, and 401 described in the first to the fourth example embodiments may be applied to the rod lens array 601 in the contact image sensor head 600 according to the sixth example embodiment. Hence, it is possible to suppress a variation in relative positional relationship between the rod lens array 601 and the semiconductor light-receiving device arrays 603, irrespective of a change in usage environment such as, but not limited to: a change in humidity; a change in temperature attributed to, for example but not limited to, spontaneous heat generation derived from the COB 604; or a change in any other factor.

Hence, it is possible for the contact image sensor head 600 according to the sixth example embodiment to achieve stable light reception performance irrespective of the change in usage environment including the changes in humidity and temperature.

[Seventh Example Embodiment]

Figure 21:
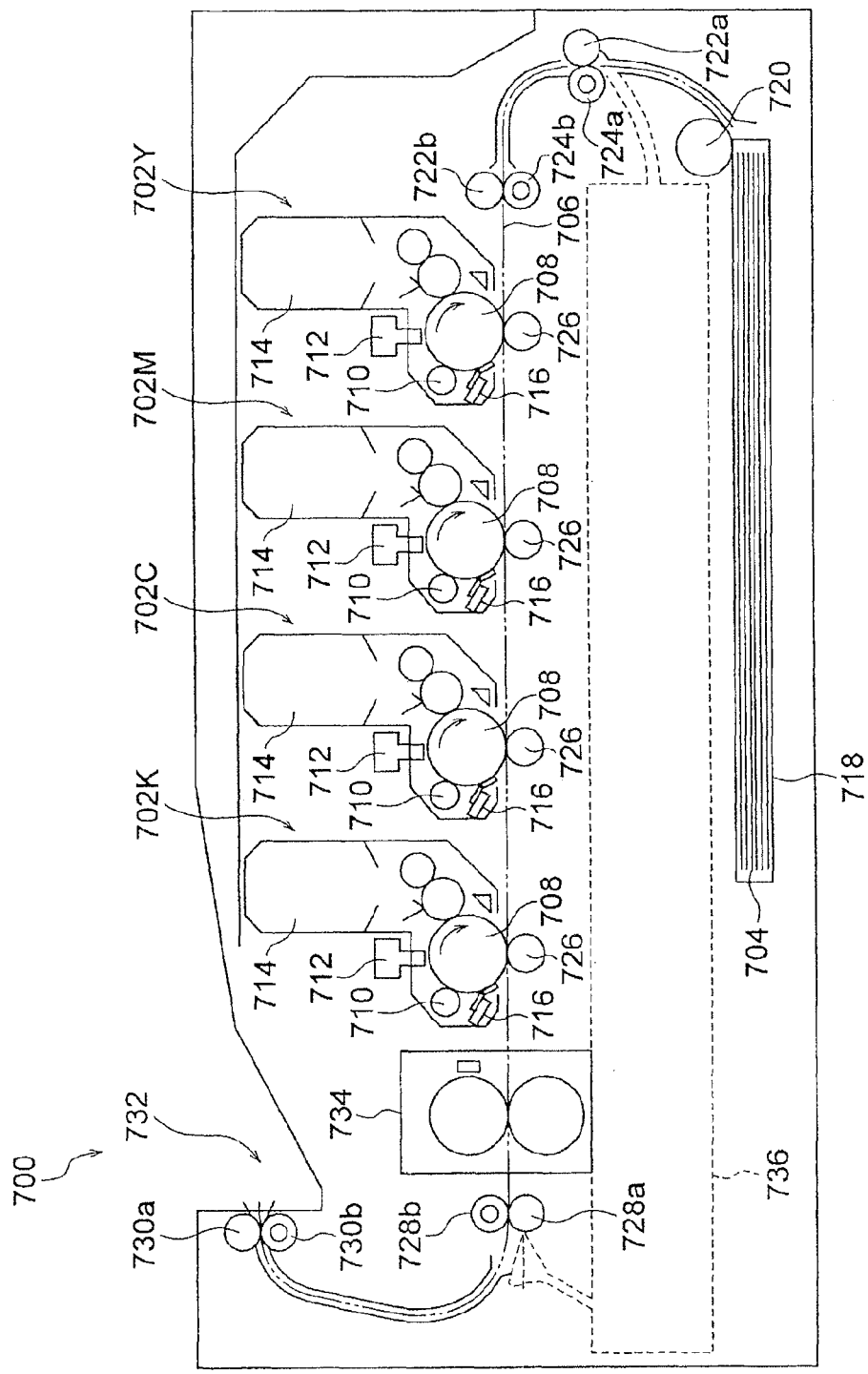
FIG. 21 is a schematic cross-sectional view of a structure of an LED printer as one example of an image forming apparatus according to a seventh example embodiment of the invention.

FIG. 21 is a schematic cross-sectional view of a structure of an LED printer 700 as one non-limiting example of an image forming apparatus according to a seventh example embodiment of the invention. The LED printer 700 may be a printer to which the LED print head 500 described in the fifth example embodiment is applied as an exposure unit.

The LED printer 700 may form, based on an electrophotographic process, a monochrome image or a color image with use of developers having their respective colors of yellow (Y), magenta (M), cyan (C), and black (K). The LED printer 700 may have four process units 702Y, 702M, 702C, and 702K corresponding to the respective colors of yellow (Y), magenta (M), cyan (C), and black (K). The process units 702Y, 702M, 702C, and 702K may be provided side-by-side along a conveying path 706 of a recording medium 704 such as, but not limited to, paper.

The process units 702Y, 702M, 702C, and 702K each may include a photosensitive drum 708, a charging unit 710, and an exposure unit 712. The photosensitive drum 708 may serve as an image supporting member. The charging unit 710 may be provided at a surrounding part of the photosensitive drum 708, and adapted to charge a surface of the photosensitive drum 708. The exposure unit 712 may irradiate the charged surface of the photosensitive drum 708 with light that corresponds to image data received from the outside to form an electrostatic latent image. The LED print head 500 described in the fifth example embodiment may be applied to the exposure unit 712.

The process units 702Y, 702M, 702C, and 702K each may further include a developing unit 714 and a cleaning unit 716. The developing unit 714 may feed a toner as a developer to the surface of the corresponding photosensitive drum 708 on which the electrostatic latent image is formed. The cleaning unit 716 may remove the toner remaining on the surface of the corresponding photosensitive drum 708. Each of the photosensitive drums 708 may rotate in a direction denoted by an arrow by means of drive force received from a drive mechanism that may include elements such as a drive source and gears.

The LED printer 700 may further include a medium cassette (paper cassette) 718 and a hopping roller 720. The medium cassette 718 may store the recording medium 704 including paper. The hopping roller 720 may be adapted to convey the recording medium 704 one by one in a separated fashion. Downstream of the hopping roller 720 in a conveying direction of the recording medium 704 may be pinch rollers 722a and 722b and resist rollers 724a and 724b. The resist rollers 724a and 724b each may pinch the recording medium 704 in conjunction with corresponding one of the pinch rollers 722a and 722b to convey the recording medium 704 to the process units 702Y, 702M, 702C, and 702K while correcting a skew of the recording medium 704. The hopping roller 720 and the resist rollers 724a and 724b each may be rotated in accordance with a drive source that may include elements such as a motor and gears.

The LED printer 700 may further include transfer rollers 726. The transfer rollers 726 each may be disposed to face corresponding one of the photosensitive drums 708 of the respective process units 702Y, 702M, 702C, and 702K. Each of the transfer rollers 726 may be made of a semi-conductive rubber or any other suitable material. Also, the LED printer 700 may include a fixing unit 734, discharge rollers 728a, 728b, 730a, and 730b, and a stacker 732.

The photosensitive drums 708 and the transfer rollers 726 may have their respective potentials that may be so set as to allow toner images formed on the respective photosensitive drums 708 to be transferred onto the recording medium 704.

The recording media 704 stacked in the medium cassette 718 may be conveyed one by one in a separated fashion by the hopping roller 720. Each recording medium 704 fed from the medium cassette 718 may pass through the resist rollers 724a and 724b and the pinch rollers 722a and 722b to sequentially pass through regions between the photosensitive drums 708 and the transfer rollers 726 of the respective process units 702Y, 702M, 702C, and 702K. The recording medium 704 may pass through the regions between the photosensitive drums 708 and the transfer rollers 726 to be subjected to sequential transfer of the toner images having their respective colors onto the recording medium 704 in the process units 702Y, 702M, 702C, and 702K, followed by application of heat and pressure by means of the fixing unit 734 to fix the toner images having the respective colors to the recording medium 704. The recording medium 704 to which the toner images are fixed may be discharged onto the stacker 732 through the discharge rollers 728a, 728b, 730a, and 730b.

Note that FIG. 21 illustrates a configuration example of the LED printer 700 in which printing is performed only on one side of the recording medium 704. In an example of performing printing on both sides of the recording medium 704, a medium reversing unit (paper reversing unit) 736 adapted to reverse the recording medium 704 may be provided at a position surrounded by a dotted line in FIG. 21.

The LED printer 700 according to the seventh example embodiment may use the LED print head 500 described in the fifth example embodiment for the exposure unit 712, making it possible to achieve stable light illumination performance irrespective of the change in usage environment including the changes in humidity and temperature. Hence, it is possible to maintain stable printing quality irrespective of the change in the usage environment.

[Eighth Example Embodiment]

Figure 22:
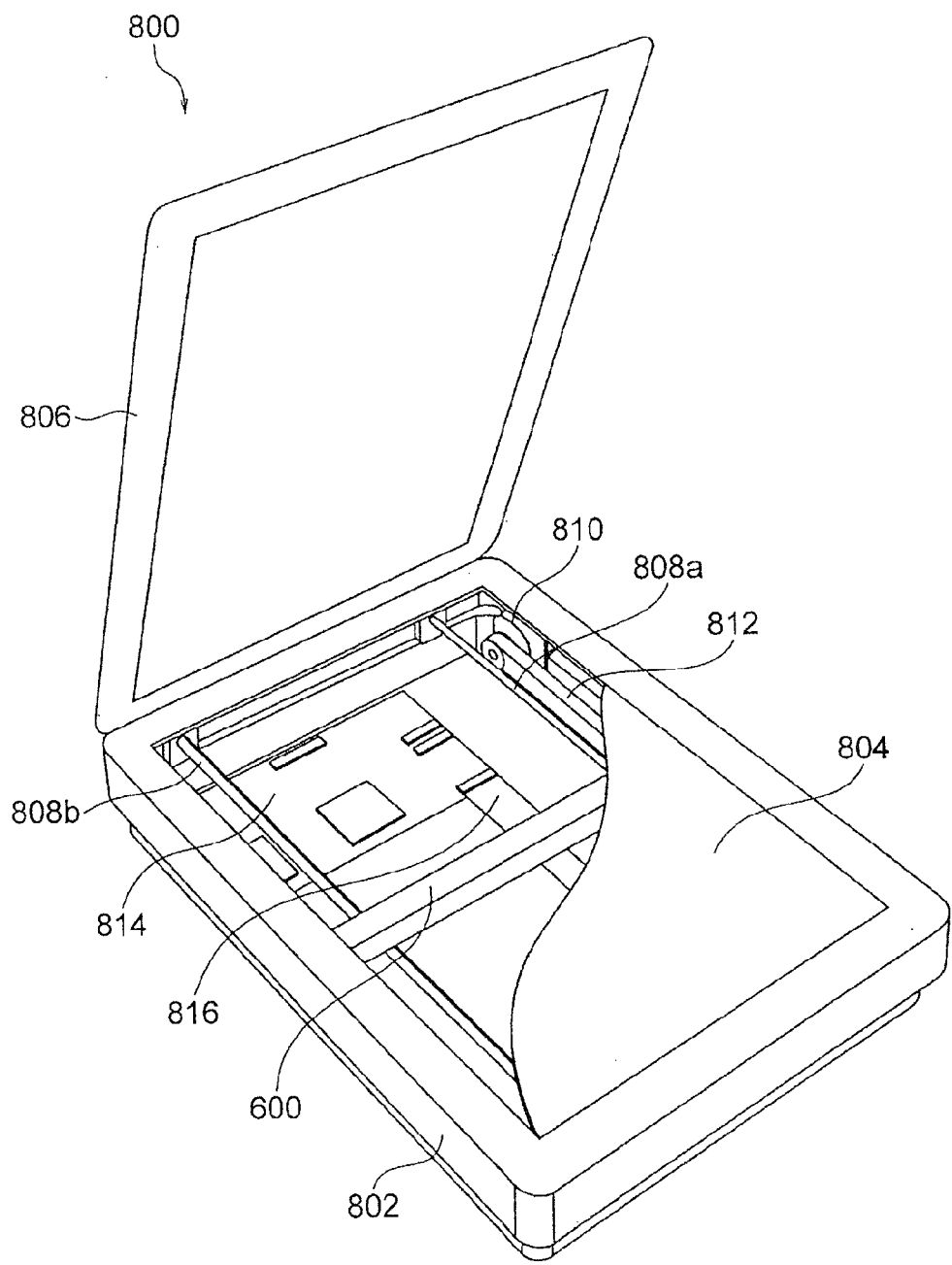
FIG. 22 is a schematic perspective view of an image scanner as one example of an image reading apparatus according to an eighth example embodiment of the invention.

FIG. 22 is a schematic perspective view of an image scanner 800 as one non-limiting example of an image reading apparatus according to an eighth example embodiment of the invention. The image scanner 800 may be a flatbed contact image scanner to which the contact image sensor head 600 described in the sixth example embodiment is applied.

Referring to FIG. 22, the image scanner 800 may include a housing 802, a document table 804 on which a document is to be placed, and a cover 806 (or a document table cover) that holds down the document placed on the document table 804 from above. Inside the housing 802 may be the contact image sensor head 600, guides 808a and 808b, a stepping motor 810, a drive belt 812, a control circuit 814, and a flexible flat cable 816.

The contact image sensor head 600 may be so supported by the pair of guides 808a and 808b fixed to the housing 802 as to be movable linearly along the guides 808a and 808b. The contact image sensor head 600 may be coupled to the drive belt 812 that may be coupled to the stepping motor 810, to slide the contact image sensor head 600 in a vertical scanning direction along the guides 808a and 808b. The control circuit 814 may perform a control of the contact image sensor head 600, and may be connected to the contact image sensor head 600 through the flexible flat cable 816.

The image scanner 800 according to the eighth example embodiment may use the contact image sensor head 600 described in the sixth example embodiment, making it possible to achieve stable light reception performance irrespective of the change in usage environment including the changes in humidity and temperature. Hence, it is possible to maintain stable image reading quality irrespective of the change in the usage environment.

Also, as used herein, the term "plate" may be used interchangeably with the term "sheet".

Furthermore, the invention encompasses any possible combination of some or all of the various embodiments and the modification examples described herein and incorporated herein.

It is possible to achieve at least the following configurations from the above-described example embodiments of the invention.

(1) A rod lens array, including:
a plurality of lenses; and
a pair of side plate sections interposing side surfaces of the respective lenses in between to hold the lenses, and each including
a first side plate provided adjacent to the lenses, and
a second side plate provided on outer side of the first side plate, and having machinability lower than machinability of the first side plate, and a linear expansion coefficient smaller than linear expansion coefficient of the first side plate.

(2) The rod lens array according to (1), wherein the lenses each have both ends in an optical axis direction of the lenses, and the both ends of the lenses are protruded more outward in the optical axis direction than both ends of each of the second side plates in the optical axis direction.

(3) A rod lens array, including:
a plurality of lenses each having both ends in an optical axis direction of the lenses; and
a pair of side plate sections interposing side surfaces of the respective lenses in between to hold the lenses, and each including
a first side plate provided adjacent to the lenses, and
a second side plate provided on outer side of the first side plate, and
the both ends of the lenses being protruded more outward in the optical axis direction than both ends of each of the second side plates in the optical axis direction.

(4) The rod lens array according to (3), wherein each of the first side plates has both ends in the optical axis direction, and the both ends of each of the first side plates each have a step.

(5) The rod lens array according to (3) or (4), wherein each of the second side plates has machinability lower than machinability of each of the first side plates.

(6) The rod lens array according to (3) or (4), wherein each of the second side plates has a linear expansion coefficient smaller than linear expansion coefficient of each of the first side plates.

(7) The rod lens array according to any one of (1) to (6), wherein each of the second side plates has hardness higher than hardness of each of the first side plates.

(8) The rod lens array according to any one of (1) to (7), wherein each of the first side plates has thickness smaller than thickness of each of the second side plates.

(9) The rod lens array according to any one of (1) to (8), wherein
each of the first side plates has Vickers hardness of 100 HV or less, and
the linear expansion coefficient of each of the second side plates is in a range from 4 ppm/° C. to 15 ppm/° C.

(10) The rod lens array according to any one of (1) to (9), wherein
each of the first side plates includes, as a constituent material, one of a phenol resin, an epoxy resin, an acrylonitrile butadiene styrene resin, and an acrylic resin, and
each of the second side plates includes, as a constituent material, one of: a glass epoxy resin; an acrylonitrile butadiene styrene resin mixed with a glass filler; glass; and a ceramic.

(11) The rod lens array according to any one of (1) to (9), wherein the first side plates and the second side plates each include a prepreg as a constituent material.

(12) The rod lens array according to (11), wherein the first side plates each including the prepreg and the respective corresponding second side plates each including the prepreg are subjected to stacking while the first side plates and the second side plates are semi-cured, followed by baking while the first side plates and the respective corresponding second side plates are pressed.

(13) The rod lens array according to any one of (1) to (12), wherein the side plate sections each further include a third side plate provided on outer side of corresponding one of the second side plates.

(14) The rod lens array according to (13), wherein each of the third side plates is made of a constituent material same as a constituent material of each of the first side plates.

(15) An LED print head, including:
a substrate on which a plurality of semiconductor light-emitting device arrays are arrayed;
the rod lens array according to any one of (1) to (14); and
a holder that holds the rod lens array and the substrate to cause surfaces of the respective semiconductor light-emitting device arrays to be located at focal positions of the respective lenses provided in the rod lens array.

(16) A contact image sensor head, including:
a substrate on which a plurality of semiconductor light-receiving device arrays are arrayed linearly;
the rod lens array according to any one of (1) to (14); and
a holder that holds the rod lens array and the substrate to cause surfaces of the respective semiconductor light-receiving device arrays to be located at focal positions of the respective lenses provided in the rod lens array.

(17) An image forming apparatus, including the LED print head according to (15).

(18) An image reading apparatus, including the contact image sensor head according to (16).

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A rod lens array, comprising:
a plurality of lenses; and
a pair of plate sections interposing side surfaces of the respective lenses in between to hold the lenses, and each including
a first plate provided adjacent to the lenses, and
a second plate provided on an outer side of the first plate, and having a machinability lower than a machinability of the first plate, and a linear expansion coefficient smaller than a linear expansion coefficient of the first plate, and
wherein the plurality of lenses, the first plate, and the second plate are provided in the following order, starting at the plurality of lenses—the plurality of lenses, the first plate, and the second plate.

2. The rod lens array according to claim 1, wherein the lenses each have both ends in an optical axis direction of the lenses, and the both ends of the lenses are protruded more outward in the optical axis direction than both ends of each second plate in the optical axis direction.

3. The rod lens array according to claim 1, wherein
each first plate has both ends in the optical axis direction, and the both ends of each first plate each have a step.

4. The rod lens array according to claim 1, wherein each second plate has a hardness higher than a hardness of each first plate.

5. The rod lens array according to claim 1, wherein each first plate has a thickness smaller than a thickness of each second plate.

6. The rod lens array according to claim 1, wherein
each first plate has a Vickers hardness of 100 HV or less, and
the linear expansion coefficient of each second plate is in a range from 4 ppm/° C. to 15 ppm/° C.

7. The rod lens array according to claim 1, wherein
each first plate includes, as a constituent material, one of a phenol resin, an epoxy resin, an acrylonitrile butadiene styrene resin, and an acrylic resin, and
each second plate includes, as a constituent material, one of: a glass epoxy resin; an acrylonitrile butadiene styrene resin mixed with a glass filler; glass; and a ceramic.

8. The rod lens array according to claim 1, wherein each first plate and each second plate includes a prepreg as a constituent material.

9. The rod lens array according to claim 8, wherein each first plate includes the prepreg and the respective corresponding second plate each including the prepreg are subjected to stacking while the first plate and the second plate are semi-cured, followed by baking while the first plate and the respective corresponding second plate are pressed.

10. The rod lens array according to claim 1, wherein the plate sections each further include a third plate provided on an outer side of a corresponding second plate.

11. The rod lens array according to claim 10, wherein each third plate is made of a constituent material same as a constituent material of each first plate.

12. An LED print head, comprising:
a substrate on which a plurality of semiconductor light-emitting device arrays are arrayed;
the rod lens array according to claim 1; and
a holder that holds the rod lens array and the substrate to cause surfaces of the respective semiconductor light-emitting device arrays to be located at focal positions of the respective lenses provided in the rod lens array.

13. A contact image sensor head, comprising:
a substrate on which a plurality of semiconductor light-receiving device arrays are arrayed linearly;
the rod lens array according to claim 1; and
a holder that holds the rod lens array and the substrate to cause surfaces of the respective semiconductor light-receiving device arrays to be located at focal positions of the respective lenses provided in the rod lens array.

14. An image forming apparatus, comprising the LED print head according to claim 12.

15. An image reading apparatus, comprising the contact image sensor head according to claim 13.

* * * * *